United States Patent
Lee

(10) Patent No.: US 11,673,305 B2
(45) Date of Patent: Jun. 13, 2023

(54) PARTIALLY ROTATED ECCENTRIC DRIVE FOR VALVE PIN

(71) Applicant: Synventive Molding Solutions, Inc., Peabody, MA (US)

(72) Inventor: Christopher Lee, Beverly, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 23 days.

(21) Appl. No.: 17/527,415

(22) Filed: Nov. 16, 2021

(65) Prior Publication Data

US 2022/0072749 A1 Mar. 10, 2022

Related U.S. Application Data

(63) Continuation of application No. PCT/US2019/046139, filed on Aug. 12, 2019, and a
(Continued)

(51) Int. Cl.
*B29C 45/28* (2006.01)
*B29C 45/73* (2006.01)
*B29C 45/72* (2006.01)

(52) U.S. Cl.
CPC ........ *B29C 45/7331* (2013.01); *B29C 45/281* (2013.01); *B29C 45/2806* (2013.01);
(Continued)

(58) Field of Classification Search
CPC .............. B29C 45/2806; B29C 45/281; B29C 45/7331
See application file for complete search history.

(56) References Cited

U.S. PATENT DOCUMENTS 6,086,357 A 7/2000 Steil et al.

FOREIGN PATENT DOCUMENTS

| CN | 204019889 U | 12/2014 |
| DE | 202014103152 U1 | 10/2014 |

(Continued)

OTHER PUBLICATIONS

Written Opinion of the International Preliminary Examining Authority in related international application No. PCT/US2019/046139 dated Jun. 20, 2020.
(Continued)

*Primary Examiner* — James Sanders
(74) *Attorney, Agent, or Firm* — Polsinell, P.C.

(57) ABSTRACT

An injection molding apparatus (5) comprising an injection molding machine (IMM), a heated manifold (60) that receives injection fluid (9) and distributes the injection fluid through a fluid distribution channel (120), a mold (70) having a cavity (80) and one or more valves (50) having a valve pin (100) the one or more valves (50) being comprised of:
an electrically driven actuator (200),
a controller including an algorithm that controllably limits rotation of a shaft (12) or output rotation device (16, 430, 500) during the course of an entire injection cycle to selectable angular positions that create a moment arm that extends between selected a selected minimum moment arm and a selected maximum moment arm, the selectable angular positions being between 70 degrees above and 70 degrees below an angular position that corresponds to the selected maximum moment arm.

33 Claims, 24 Drawing Sheets

Related U.S. Application Data continuation of application No. 15/811,877, filed on Nov. 14, 2017, now Pat. No. 11,007,695, which is a continuation of application No. PCT/US2017/059641, filed on Nov. 2, 2017, and a continuation-in-part of application No. 15/204,555, filed on Jul. 7, 2016, now Pat. No. 10,005,215, which is a continuation of application No. PCT/US2016/016944, filed on Feb. 8, 2016.

(60) Provisional application No. 62/853,414, filed on May 28, 2019, provisional application No. 62/421,696, filed on Nov. 14, 2016, provisional application No. 62/135,871, filed on Mar. 20, 2015.

(52) U.S. Cl.
CPC .............. *B29C 45/72* (2013.01); *B29C 45/73* (2013.01); *B29C 2045/2868* (2013.01); *B29C 2045/7271* (2013.01); *B29C 2045/735* (2013.01); *B29K 2995/0013* (2013.01)

(56) References Cited

FOREIGN PATENT DOCUMENTS

| | | |
|---|---|---|
| DE | 202014103153 U1 | 10/2014 |
| WO | 2019/100085 A1 | 5/2019 |

OTHER PUBLICATIONS

International Search Report and Written Opinion in related international application No. PCT/US2019/046139 dated Feb. 3, 2020.

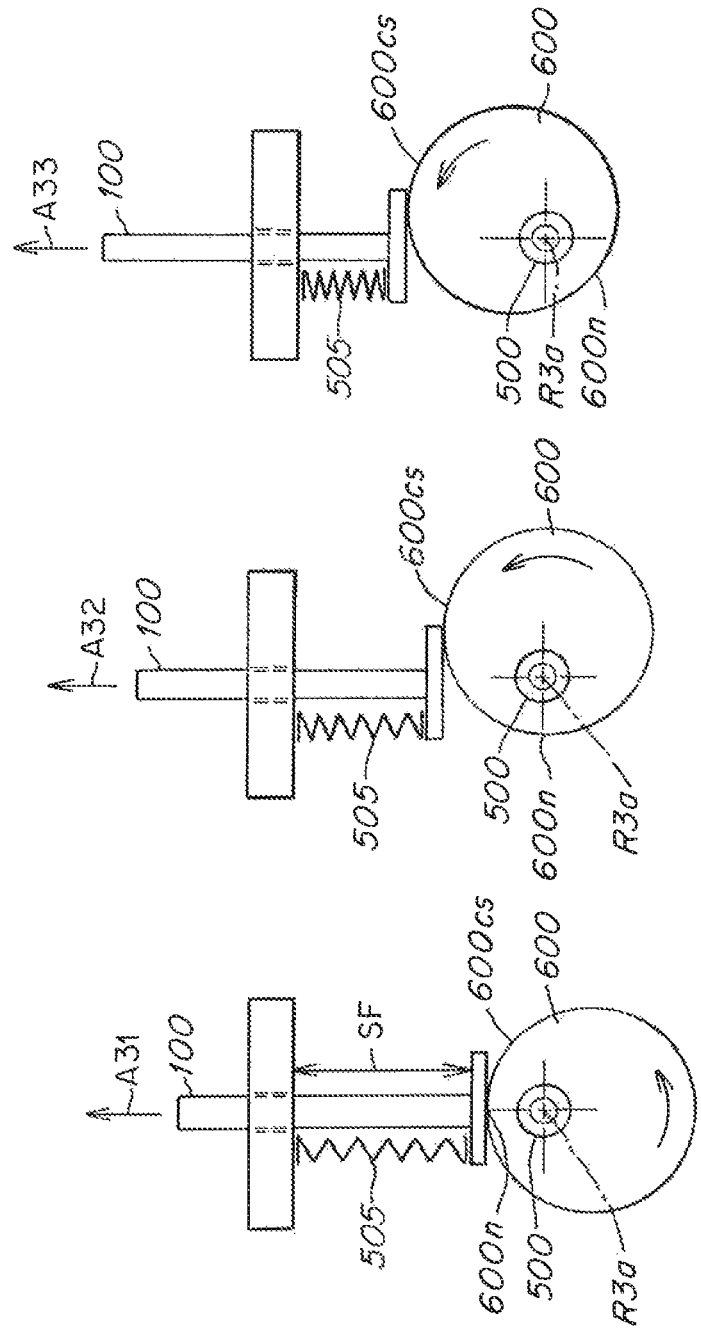

PARTIALLY ROTATED ECCENTRIC DRIVE FOR VALVE PIN

RELATED APPLICATIONS

This application is a continuation of PCT/US2019/046139 filed Aug. 12, 2019 which in turn claims the benefit of priority to U.S. provisional application Ser. No. 62/853,414 filed May 28, 2019 the disclosure of which is incorporated by reference as if fully set forth herein.

This application is also a continuation of and claims the benefit of priority to U.S. application Ser. No. 15/811,877 filed Nov. 14, 2017 which is a continuation of PCT/US2017/059641 filed Nov. 2, 2017 which in turn claims the benefit of priority to U.S. provisional application Ser. No. 62/421,696 filed Nov. 14, 2016, and U.S. Ser. No. 15/811,877 is also a continuation in part of U.S. application Ser. No. 15/204,555 filed Jul. 7, 2016 which in turn is a continuation of PCT/US2016/016944 filed Feb. 8, 2016 which claims the benefit of priority to U.S. provisional application 62/135,871 filed Mar. 20, 2015, the disclosures of which are incorporated by reference in their entirety as if fully set forth herein.

The disclosures of all of the following are incorporated by reference in their entirety as if fully set forth herein: U.S. Pat. Nos. 5,894,025, 6,062,840, 6,294,122 (7018), U.S. Pat. Nos. 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. No. 6,062,840 (7052), U.S. Pat. No. 6,261,075 (7052US1), U.S. Pat. Nos. 6,599,116, 7,234,929 (7075US1), U.S. Pat. No. 7,419,625 (7075US2), U.S. Pat. No. 7,569,169 (7075US3), U.S. Pat. No. 8,297,836 (7087) U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), International Application WO2011119791 filed Mar. 24, 2011 (7094), U.S. application Ser. No. 10/101,278 filed Mar. 19, 2002 (7070) and PCT Application No. PCT/US11/062099 (7100WO0) and PCT Application No. PCT/US11/062096 (7100WO1), U.S. Pat. Nos. 8,562,336, 8,091,202 (7097US1) and U.S. Pat. No. 8,282,388 (7097US2), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), U.S. Pat. No. 9,724,861 (7129US4), U.S. Pat. No. 9,662,820 (7129US3), international application WO2014172100 (7131WO0), Publication No. WO2014209857 (7134WO0), international application WO2015066004 (7140WO0), Publication No. WO2015006261 (7135WO0), International application Publication No. WO2016153632 (7149WO2), International application publication no. WO2016153704 (7149WO4), U.S. Pat. No. 9,937,648 (7135US2), U.S. Pat. No. 10,569,458 (7162US1), International Application WO2017214387 (7163WO0), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017 and International Application WO2018129015 (7169WO0), International application WO2018148407 (7170WO0), International application WO2018148407 (7171WO0), international application WO2018175362 (7172WO0), international application WO2018194961 (7174WO0), international application WO2018200660 (7176WO0), international application WO2019013868 (7177WO0), international application WO2019100085 (7178WO0), international application WO2020176479 (7185WO0), international application WO2021/034793 (7187WO0), international application WO2021080767 (7188WO0).

BACKGROUND OF THE INVENTION

Actuators that use a driven rotating mechanism such as the rotor of an electric motor to effect the linear drive of a valve pin have been used in injection molding systems such as disclosed in U.S. Pat. No. 6,294,122, the disclosure of which is incorporated by reference as if fully set forth herein.

One approach to using an eccentric cam to drive a valve pin in an injection molding system is to construct the device so that the cam can rotate though an entire 360 degrees (referred to herein as full rotation device or "FRD"). On some devices, this is inevitable as there is no practical way to limit the amount of rotation as the action of the cam is continuous such that the cam does not come to rest so it is necessary to continue its operation as it enters the $361^{st}$ degree of rotation. Overhead cams as found in automobile engines are an example.

Another approach is to use only a segment of the full 360 degrees of rotation (hereinafter "PRD"). Instead of rotating continuously, the driven shaft of the actuator that rotatably drives the eccentric be rotated through a selected fraction of the 360 degrees and then stopped. When the shaft direction is reversed, the sled to which the valve pin is interconnected can be drivably moved in the opposite direction.

Preferably, the rotating shaft or rotor of the actuator, typically an electric actuator, is interconnected to a rotational speed reducer is required as motor output speeds are too high and of too low a torque to be useful. Preferably a strain wave gear is used as the rotational speed reducer.

SUMMARY OF THE INVENTION

With a PRD based system:

1) The end-of-stroke positions of a valve pin can be established by an electronic controller (1000) instead of manually or by trial and error as with an FRD based system. With a PRD system, the valve pin, being interconnected to a linearly moving sled, slide or pin mount, can be set to a selectable end of stroke position along the linear path of travel of the valve pin by controllably rotating the cam a selected degree of rotation around the axis of rotation (12a, R3a) with a programmable servo motor. The end of stroke or starting position of the valve pin, then, is controllably selectable via an electric or electronic control system. In an FRD system, the end of stroke or start cycle pin position is established only mechanically by varying the mounting location of the actuator assembly with respect to the hot runner and the gate to the mold. Thus, in a PRD system, establishing the starting or end of stroke valve pin position is simpler for the user and can be easily altered to accommodate wear and other changes to the system.

2) The travel path or length of an injection cycle stroke of a valve pin can be modified for the same reasons as stated above regarding the ability to pre-select the end of stroke or starting positions of the valve pin. Thus, it is possible to meter the amount of polymer entering the gate whereas a pin close to the gate restricts the flow relative to a pin further away.

3) In an FRD system that uses a sled, slide or pin mount such sled 43 shown in FIGS. 6-9, the location of the force F as applied by the outer surface of the cam member 600 on the sled 43 moves across a surface that is as long as the full stroke of the actuator, a geometric function of having a fully rotated cam or eccentrically driven pin. However the opposing force against the linear travel of the pin 100 from force exerted by the fluid material on the pin does not move; it remains fixed along the axis of the pin 100 and gate. This creates a "couple", a pair of forces F that are not co-axial as shown in FIG. 6A which creates a tendency for the sled 43 to want to rotate. The amount of this counteraction depends linearly on the force F and the distance, D, FIG. 6A. A PRD that only rotates the eccentrically mounted cam member 600 a portion of the full 360 degrees during the course of an injection cycle thus reduces the distance, D which reduces the degree of strength needed to maintain the sled's 43 rotational position.

4) The same is true regarding the amount of the force. The more force F, the more need there is to counter the tendency of the sled 43 to rotate. When using the FRD, the amount of force that is exerted on the pin varies enormously over the entire 360 degree rotation of the cam member 600. When the cam 600 is located mid-stroke on either design, FIG. 6B, the force on the valve pin 100 is calculated as the torque at the shaft multiplied by the moment arm, M. The radius, R, is also equal to half the stroke for the FRD. But as the cam 600 moves the sled 43 to the end of stroke condition, the moment arm also changes, becoming shorter. On the FRD, it eventually becomes zero. The force, then, is again equal to the moment arm times the torque, but because the arm is zero, the force is a theoretical infinite. An advantage of the PRD where the change in the length of the moment arm M is limited, FIG. 6B, and controlled. But, that's not to say that a very small amount of rotation is preferred. An additional amount of force during the pin-closed portion of the pin move is helpful as semi-solidified polymer is in the gate and this takes an added level of force to displace.

5) The opposite is true for the pin velocity. At mid-stroke, the velocity is highest (for both FRD & PRD), but at the end-of-stroke conditions, the velocity of the pin become zero for the FRD. The velocity of the PRD must also be zero at the end of stroke because the motor must be stopped. However, when it is time to move the pin 100 from the end of stroke position again, the FRD system needs to start its motor again to create a rotational velocity and overcome the geometric conditions where the pin velocity is also zero due to a zero-length moment arm resulting in slower pin acceleration. With the PRD, the moment arm at the endo of stroke is shorter than at mid-stroke, but infinitely longer than zero as in the FRD thereby facilitating a higher acceleration of the pin beginning from the end of stroke position. This is helpful in getting the pin out of the way in molding operations.

6) While use of a PRD system keeps the moment arm M at the pin open condition about equal to the pin closed position, that equality can be changed to bias the moment arm at one end compared to the other to suit customer preferences.

A preferred range of partial rotation for a PRD system between fully open and fully closed (or end of stroke) position is about 80 degrees or about 40 degrees above and about 40 degrees below the full or maximum moment arm rotational position of the cam 600 which is typically the 90 degree or 270 degree position to which the cam 600 has been rotated, although other degrees of partial rotation less than a full 360 degrees can be used to achieve the results of a PRD system as described above.

In accordance with the invention there is provided an injection molding apparatus (5) comprising:

an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that controls injection of the injection fluid (9) into the mold cavity, the one or more valves (50) being comprised of:

an electrically driven actuator (200) having a driven rotatable rotor drivably rotatably interconnected to a shaft (12) or to an output rotation device (16, 430, 500) that is rotatably drivable 360 degrees around an output rotation axis (12a, R3a), a rotary to linear converter device that includes an eccentric (600) that is eccentrically disposed or mounted off center a selected distance (ED, R) from the output rotation axis (12a, R3a) in an arrangement such that when the shaft (12) or rotation device (16, 430, 500) is rotatably driven, the eccentric (600) is eccentrically rotatably drivable around the output rotation axis (12a, R3a) to selectable angular positions above and below either a 270 degree position or a 90 degree position, a controller (1000) interconnected to the shaft (12) or output rotation device (16, 430, 500), the controller (1000) including an algorithm that controllably limits rotation of the shaft (12) or output rotation device (16, 430, 500) during the course of an entire injection cycle to angular positions between about 70 degrees above and 70 degrees below the 270 degree position or between about 70 degrees above and 70 degrees below the 90 degree position, wherein a preselected angular position between the 270 or 90 degree position and 70 degrees above defines a fully open valve pin position (PFO) and a preselected angular position between the 270 or 90 degree position and 70 degrees below defines a valve pin position where the gate is closed (PFC), the pin or shaft (100) being interconnected to or interengaged with the driven eccentric (600) in an arrangement such that the pin or shaft (100) is driven reciprocally along a linear path of travel (A) as the eccentric (600) is eccentrically rotatably driven.

In such an apparatus the eccentric can comprise a cam member (600), the rotary to linear converter device including a slide or sled (43) interconnected to the drive shaft or rotor (12), the slide or sled (43) having a cammed slot (43sl) having a slot surface (43ss) adapted to engage an exterior surface (600cs) of the eccentric (600) to cause the sled or slide (43) to move along the linear path of travel (A) as the eccentric (600) is eccentrically rotatably driven around the output rotation axis (12a, R3a).

The rotary to linear converter device can be adapted to mechanically or frictionally stop or limit linear travel of the valve pin (100) at or to selectable linear positions.

The cam member (600), slide or sled 43 or associated mounts 40 can be adapted to exert a radial force (RF) between the slide or sled (43) and a complementary fixed surface (40as) at selectable rotational or angular positions of the cam member (600), the radial force (RF) being sufficient to stop rotational movement of the cam member (600) or to stop linear movement of the slide or sled (43).

Such an apparatus typically further includes a rotational speed reducing mechanism (46) interconnected to the drive shaft or rotor (12) of the actuator (200), the rotational speed reducing mechanism (46) being comprised of a rotatably driven generally elliptical or other non circular shaped device (430, 472) or one or more rotatably driven gears (430, 700) interconnected to the drive shaft or rotor (12) in an arrangement such that rotation of the drive shaft or rotor (12) is transmitted to an output rotation device (16, 430, 500) to cause the output rotation device (16, 430, 500) to be rotatably driven at a selected lower rotational speed relative to a rotational speed of the drive shaft or rotor (12).

The rotational speed reducing mechanism can comprise a strain wave gear.

the electrically driven actuator (200) is typically mounted in a remote location or position relative to the heated manifold (60) such that the electrically driven actuator (200) is insulated or isolated from thermal communication with the heated manifold (60).

In such an apparatus an elongated shaft (20, 20f) can drivably interconnect the rotatable output shaft (12) or the output rotation device (16, 430, 500) to a rotary to linear converter (40) that is interconnected to the pin or shaft (100) to convert rotation of the output shaft (12) or the output rotation device (16, 430, 500) to linear motion and drive the pin or shaft (100) linearly.

The elongated shaft typically has a length (CL) sufficient to mount the actuator (200) in a position or location remote from the heated manifold (60) such that the actuator (200) is isolated from substantial heat communication with the heated manifold (60) wherein the actuator remains interconnected to the valve pin (100) via the one or more elongated cables (20, 20f).

The elongated cable or shaft (20f) can have a length (CL) and a cable axis (CA) that is flexibly bendable along at least a portion of the cable axis (CA) into a curved or curvilinear configuration (CF) interconnects the rotatable output shaft (12) or the output rotation device (16, 430, 500) to a rotary to linear converter (40) that is interconnected to the pin or shaft (100) to convert rotation of the output shaft (12) or the output rotation device (16, 430, 500) to linear motion and drives the pin or shaft (100) linearly.

The algorithm preferably controllably limits rotation of the shaft (12) or output rotation device (16, 430, 500) during the course of an entire injection cycle to angular positions between about 40 degrees above and 40 degrees below the 270 degree position or between about 40 degrees above and 40 degrees below the 90 degree position wherein a preselected angular position between 40 above the 270 or 90 degree position defines the fully open valve pin position (PFO) and a preselected angular position 40 below the 270 or 90 degree position defines the valve pin position where the gate is closed (PFC).

The valve pin (100) is typically maintained in engagement with the radial surface (600cs) under a spring force (SF)

In another aspect of the invention there is provided a method of injecting a selected injection fluid (9) into a cavity (80) of a mold (70) in an injection molding apparatus (5) comprised of an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that controls injection of the injection fluid (9) into the mold cavity, the method comprising: selecting an electrically driven actuator (200) having a driven rotatable rotor drivably rotatably interconnected to an output shaft (12) or to an output rotation device (16, 430, 500) that is rotatably driven around an output rotation axis (12a, R3a), disposing or mounting a cam device or surface (600) eccentrically off center a selected distance (ED, R) from the output rotation axis (12a, R3a) in an arrangement such that when the shaft (12) or rotation device (16, 430, 500) is rotatably driven, the cam member or surface (600) is eccentrically rotatably driven around the output rotation axis (12a, R3a), controllably rotating the shaft (12) or output rotation device (16, 430, 500) during the course of an entire injection cycle to to angular positions between about 70 degrees above and 70 degrees below the 270 degree position or between about 70 degrees above and 70 degrees below the 90 degree position wherein a preselected angular position between the 270 or 90 degree position and 70 degrees above defines a fully open valve pin position (PFO) and a preselected angular position between the 270 or 90 degree position and 70 degrees below defines a valve pin position where the gate is closed (PFC), interconnecting to or interengaging with the pin or shaft (100) the driven cam member (600) in an arrangement such that the pin or shaft (100) is drivable reciprocally along a linear path of travel (A) as the cam member (600) is eccentrically rotatably driven, controllably operating the electrically driven actuator to drive the pin or shaft (100).

In another aspect of the invention there is provided an injection molding apparatus (5) comprising:

an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that controls injection of the injection fluid (9) into the mold cavity, the one or more valves (50) being comprised of: an electrically driven actuator (200) having a driven rotatable rotor drivably rotatably interconnected to a shaft (12) or to an output rotation device (16, 430, 500) that is rotatably drivable 360 degrees around an output rotation axis (12a, R3a), a rotary to linear converter device that includes an eccentric (600) that is eccentrically disposed or mounted off center a selected distance (ED, R) from the output rotation axis (12a, R3a) in an arrangement such that when the shaft (12) or rotation device (16, 430, 500) is rotatably driven, the eccentric (600) is eccentrically rotatably drivable around the output rotation axis (12a, R3a) to selectable angular positions above and below either a 270 degree position or a 90 degree position, a controller (1000) interconnected to the shaft (12) or output rotation device (16, 430, 500), the controller (1000) including an algorithm that controllably limits rotation of the shaft (12) or output rotation device (16, 430, 500) during the course of an entire injection cycle to selectable angular positions that create a moment arm that extends between a selected minimum moment arm relative to an absolute minimum moment arm (MM1 which is typically the 0 degree position and MM2 which is typically the 180 degree position) and a selected maximum moment arm, the selectable angular positions being between 70 degrees above and 70 degrees below an angular position that corresponds to the selected maximum moment arm (which is typically the 90 degree and 270 degree positions), wherein a preselected angular position between the angular position that corresponds to the selected maximum moment arm and 70 degrees above defines a fully open valve pin position (PFO) and a preselected angular position between the angular position that corresponds to the selected maximum moment arm and 70 degrees below defines a valve pin position where the gate is closed (PFC), the pin or shaft (100) being interconnected to or interengaged with the driven eccentric (600) in an arrangement such that the pin or shaft (100) is driven reciprocally along a linear path of travel (A) as the eccentric (600) is eccentrically rotatably driven.

In such an apparatus the selectable angular positions are preferably between 40 degrees above and 40 degrees below the angular position that corresponds to the selected maximum moment arm which is typically a 90 or 270 degree position.

In such an apparatus, the first selected angular position is preferably disposed between the angular position that corresponds to the maximum moment arm and 70 degrees above the angular position that corresponds to the maximum moment arm defines a valve pin fully open position and wherein a second selected angular position disposed between the angular position that corresponds to the maximum moment arm and 70 degrees below the angular position that corresponds to the maximum moment arm defines an end of stroke, valve pin closed or gate closed position.

In such an apparatus the first selected angular position is preferably disposed between the angular position that corresponds to the maximum moment arm and 40 degrees above the angular position that corresponds to the maximum moment arm defines a valve pin fully open position and wherein a second selected angular position disposed between the angular position that corresponds to the maximum moment arm and 40 degrees below the angular position that corresponds to the maximum moment arm defines an end of stroke, valve pin closed or gate closed position.

In such an apparatus the eccentric can comprise a cam member (600), the rotary to linear converter device including a slide or sled (43) interconnected to the drive shaft or rotor (12), the slide or sled (43) having a cammed slot (43sl) having a slot surface (43ss) adapted to engage an exterior surface (600cs) of the eccentric (600) to cause the sled or slide (43) to move along the linear path of travel (A) as the eccentric (600) is eccentrically rotatably driven around the output rotation axis (12a, R3a).

The rotary to linear converter device can be adapted to mechanically or frictionally stop or limit linear travel of the valve pin (100) at or to selectable linear positions.

The cam member (600), slide or sled 43 or associated mounts 40 can be adapted to exert a radial force (RF) between the slide or sled (43) and a complementary fixed surface (40as) at selectable rotational or angular positions of the cam member (600), the radial force (RF) being sufficient to stop rotational movement of the cam member (600) or to stop linear movement of the slide or sled (43).

Such an apparatus can further include a rotational speed reducing mechanism (46) interconnected to the drive shaft or rotor (12) of the actuator (200), the rotational speed reducing mechanism (46) being comprised of a rotatably driven generally elliptical or other non circular shaped device (430, 472) or one or more rotatably driven gears (430, 700) interconnected to the drive shaft or rotor (12) in an arrangement such that rotation of the drive shaft or rotor (12) is transmitted to an output rotation device (16, 430, 500) to cause the output rotation device (16, 430, 500) to be rotatably driven at a selected lower rotational speed relative to a rotational speed of the drive shaft or rotor (12).

In such an apparatus, the rotational speed reducing mechanism can comprise a strain wave gear.

In such an apparatus the electrically driven actuator (200) can be mounted in a remote location or position relative to the heated manifold (60) such that the electrically driven actuator (200) is insulated or isolated from thermal communication with the heated manifold (60).

In such an apparatus, an elongated shaft (20, 20f) can be drivably interconnected to the rotatable output shaft (12) or the output rotation device (16, 430, 500) to a rotary to linear converter (40) that is interconnected to the pin or shaft (100) to convert rotation of the output shaft (12) or the output rotation device (16, 430, 500) to linear motion and drive the pin or shaft (100) linearly.

In such an apparatus, the elongated shaft can have a length (CL) sufficient to mount the actuator (200) in a position or location remote from the heated manifold (60) such that the actuator (200) is isolated from substantial heat communication with the heated manifold (60) wherein the actuator remains interconnected to the valve pin (100) via the one or more elongated cables (20, 20f).

In such an apparatus an elongated cable or shaft (20f) having a length (CL) and a cable axis (CA) that is flexibly bendable along at least a portion of the cable axis (CA) into a curved or curvilinear configuration (CF) can interconnect the rotatable output shaft (12) or the output rotation device (16, 430, 500) to a rotary to linear converter (40) that is interconnected to the pin or shaft (100) to convert rotation of the output shaft (12) or the output rotation device (16, 430, 500) to linear motion and drives the pin or shaft (100) linearly.

In such an apparatus, the cam member (600) can comprise a disk, wheel, pin or projection (600p) projecting axially from a rotatable member (500) that is controllably rotatable around a rotation axis (R3a) or comprises a radial surface (600cs) of a rotatable member (500) controllably rotatable around a rotation axis (R3a).

In such an apparatus, the valve pin (100) is typically maintained in engagement with the radial surface (600cs) under a spring force (SF).

In another aspect of the invention there is provided a method of injecting a selected injection fluid (9) into a cavity (80) of a mold (70) in an injection molding apparatus (5) comprised of an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that controls injection of the injection fluid (9) into the mold cavity, the method comprising:

selecting an electrically driven actuator (200) having a driven rotatable rotor drivably rotatably interconnected to an output shaft (12) or to an output rotation device (16, 430, 500) that is rotatably driven around an output rotation axis (12a, R3a), disposing or mounting an eccentric (600) eccentrically off center a selected distance (ED, R) from the output rotation axis (12a, R3a) in an arrangement such that when the shaft (12) or rotation device (16, 430, 500) is rotatably driven, the eccentric (600) is eccentrically rotatably driven around the output rotation axis (12a, R3a), controllably rotating the shaft (12) or output rotation device (16, 430, 500) during the course of an entire injection cycle to selectable angular positions that create a moment arm that extends between selected a selected minimum moment arm and a selected maximum moment arm, the selectable angular positions being between 70 degrees above and 70 degrees below an angular position that corresponds to the selected maximum moment arm, wherein a preselected angular position between the angular position that corresponds to the selected maximum moment arm and 70 degrees above defines a fully open valve pin position (PFO) and a preselected angular position between the angular position that corresponds to the selected maximum moment arm and 70 degrees below defines a valve pin position where the gate is closed (PFC), interconnecting to or interengaging with the pin or shaft (100) the driven cam member (600) in an arrangement such that the pin or shaft (100) is drivable reciprocally along a linear path of travel (A) as the eccentric (600) is eccentrically rotatably driven, controllably operating the electrically driven actuator to drive the pin or shaft (100) or shaft (100).

BRIEF DESCRIPTION OF THE DRAWINGS

The above and further advantages of the invention may be better understood by referring to the following description in conjunction with the accompanying drawings in which:

FIGS. 5A, 5B, 5C are schematic sectional views of a rotationally driven output device having a cammed surface interengaged with pin or shaft such that the pin or shaft is driven at variable linear speed on complete rotation of the of the rotationally driven output device.

DETAILED DESCRIPTION

Figure 1:
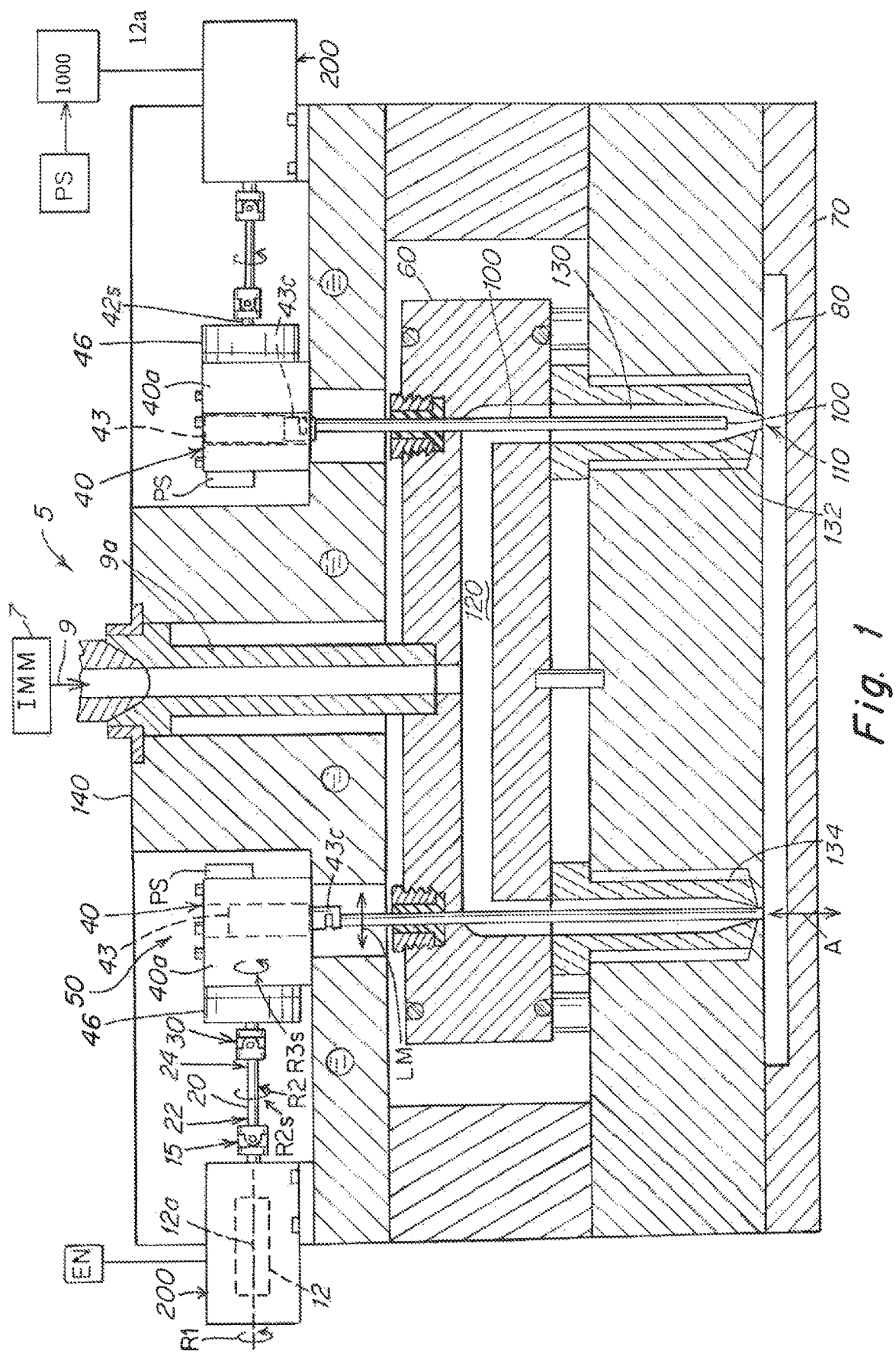
FIG. 1 is a sectional schematic view of an injection molding apparatus according to the invention showing a pair of remotely mounted electric actuators each separately interconnected via a rigid drive shaft to a rotational valve pin speed reducer, torque increaser device which in turn is drivably interconnected via an eccentric device to a linearly driven valve pin.

FIG. 1 shows a generic system or apparatus 5 according to the invention comprising an injection molding machine IMM that feeds a selected fluid 9 into an inlet 9*a* that in turns feeds into a distribution channel 120 of a heat manifold 60. As shown the manifold 60 is disposed between an upstream mounted top clamp plate 140 and a downstream mounted mold 70 that forms a cavity 80 in which the part to be molded is formed from injection fluid 9 that is routed into the cavity via downstream gate 110 that communicates with nozzle channel 130 in which valve pin 100 is disposed for controlled upstream and downstream reciprocal movement along linear axis A between gate open and gate closed positions, the gate open position shown in FIG. 1 with respect to nozzle 132 and the gate closed position shown with respect to nozzle 134.

As shown in FIG. 1 a valve 50 is provided for controlling movement of the valve pin 100, the valve 50 comprising an electrically powered actuator 200 typically comprised of an electric motor having a rotor 12 rotatably driven by an electrically powered coil such as disclosed in U.S. Pat. No. 6,294,122 the disclosure of which is incorporated by reference as if fully set forth herein.

Figure 5:
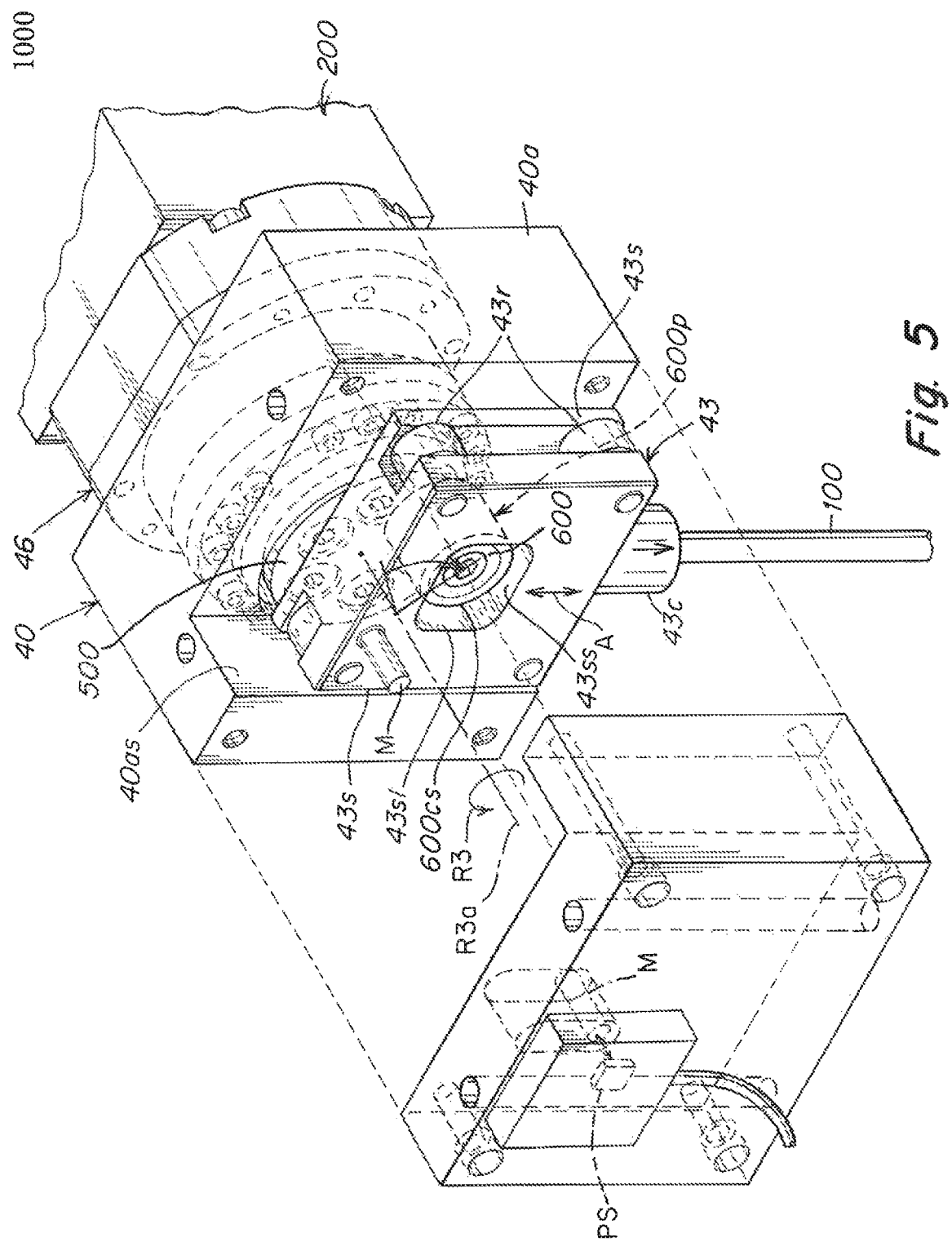
FIG. 5 is a top perspective exploded view of an electric actuator whose driven shaft is connected directly to a speed reducer which is interconnected to a rotary to linear converter where the converter is in an downstream position.

The valve pin 100 can be interconnected to or interengaged with a cam member 600 that is driven eccentrically around an output rotation axis such as the axis 12*a* of the motor rotor or the axis R3*a* of a speed reducing, torque increasing device as described herein. One example of an eccentric cam member 600 interconnected to the valve pin 100 is shown in FIGS. 5 and 6-11. Another example of an eccentric cam member 600 interengaged with a valve pin is shown in FIGS. 5A, 5B, 5C. The valve pin (100) can be maintained in engagement with the radial surface (600*cs*) under a spring force (SF) exerted by a spring (505). The eccentricity of the cam member 600 enables variable speed and higher torque control over the linear drive movement of the pin 100 along linear axis A as described with reference to FIGS. 13-16.

Figure 2:
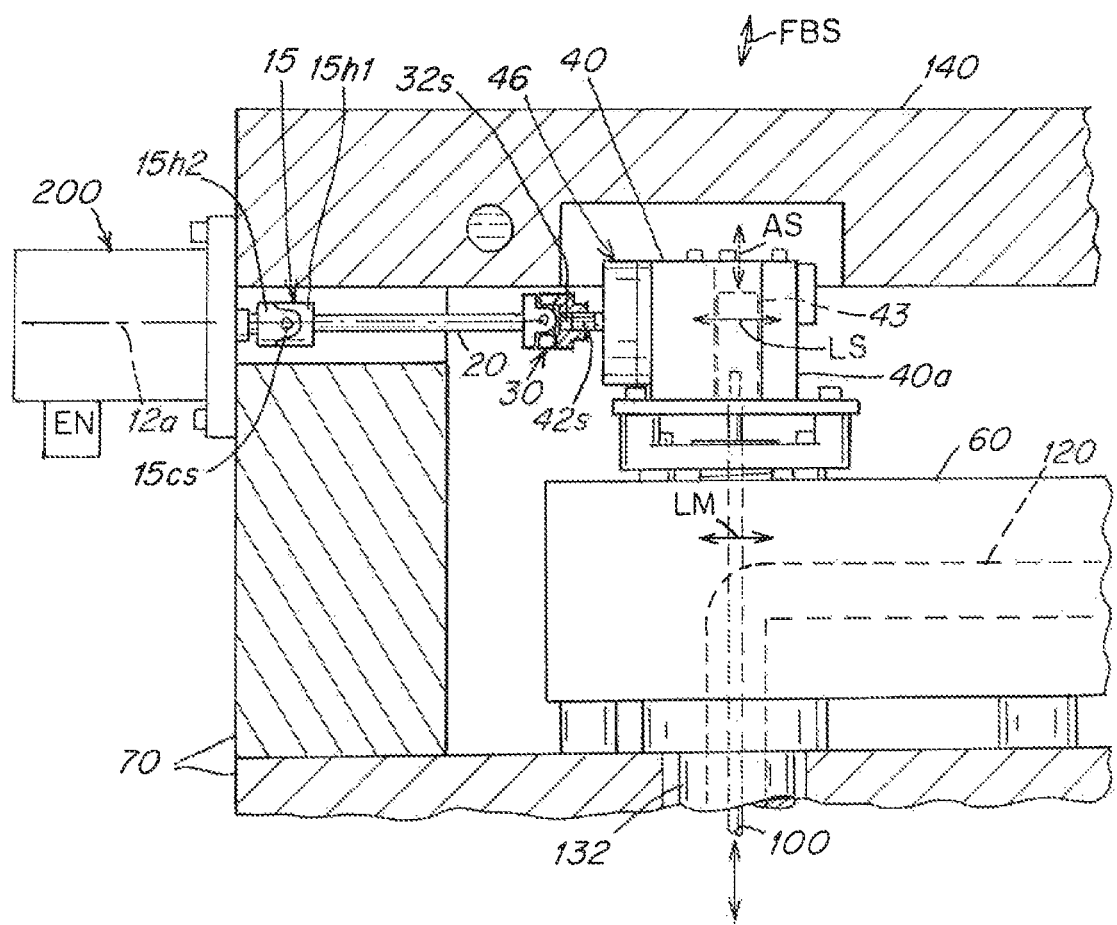
FIG. 2 is an enlarged sectional view of a portion of the FIG. 1 apparatus showing an electric actuator having a rotational speed reducer mounted to a top clamp plate and showing an interconnection of the rotor of the motor and speed reducer to a rotary to linear movement converter mechanism that is in turn interconnected to a valve pin.
Figure 3:
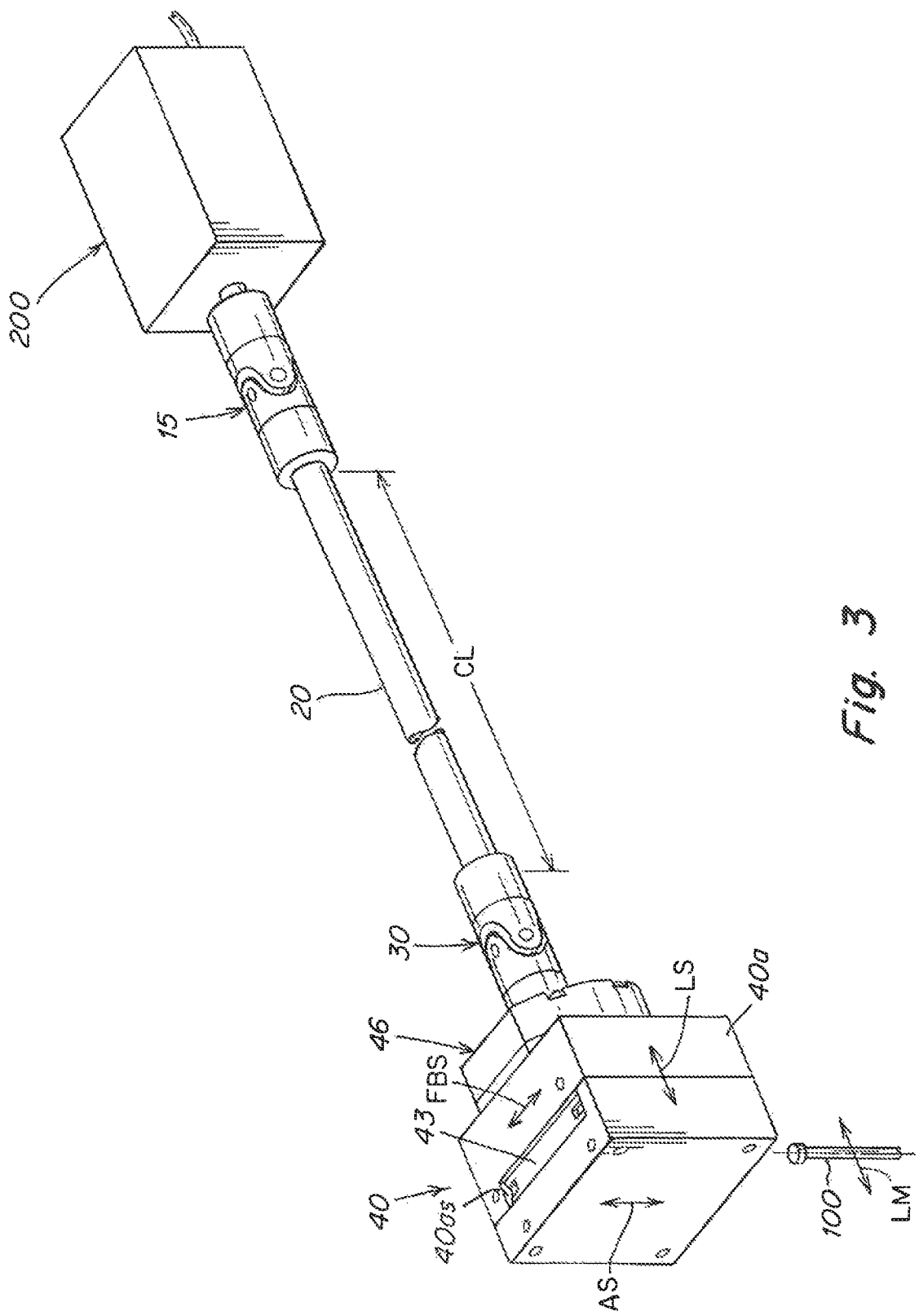
FIG. 3 is a top perspective view of a subassembly of an electric motor actuator interconnected via an elongated rigid shaft to a rotational speed reducer and rotary to linear movement converter as in FIG. 2.

In the embodiment shown in FIG. 1-3, the valve 50 includes a rigid, typically comprised of metal such as steel, elongated shaft 20 that is coupled to the rotating rotor 12 via coupling 15 at an upstream end 22 of the shaft 20 and a rotary to linear converter 40 that is coupled to a downstream end 24 of the elongated shaft 20 by coupling 30 such as a universal joint. The elongated and rigid configuration of the shaft 20 is selected so that the motor 200 and rotor 12 is necessarily disposed and mounted in a location or position that is isolated or insulated from transmission of heat from the heated manifold 60. The shaft 20 is selected to be comprised of a rigid metal material so that energy and torque force R2*s* derived from driven rotation R2 of the shaft 20 is reliably transmitted from the remotely mounted motor 200 to the rotary to linear converter assembly 40. Such a rigid shaft 20 embodiment is described in greater detail in published application no. WO2018/129015 the disclosure of which is incorporated by reference in its entirety as if fully set forth herein.

Figure 4:
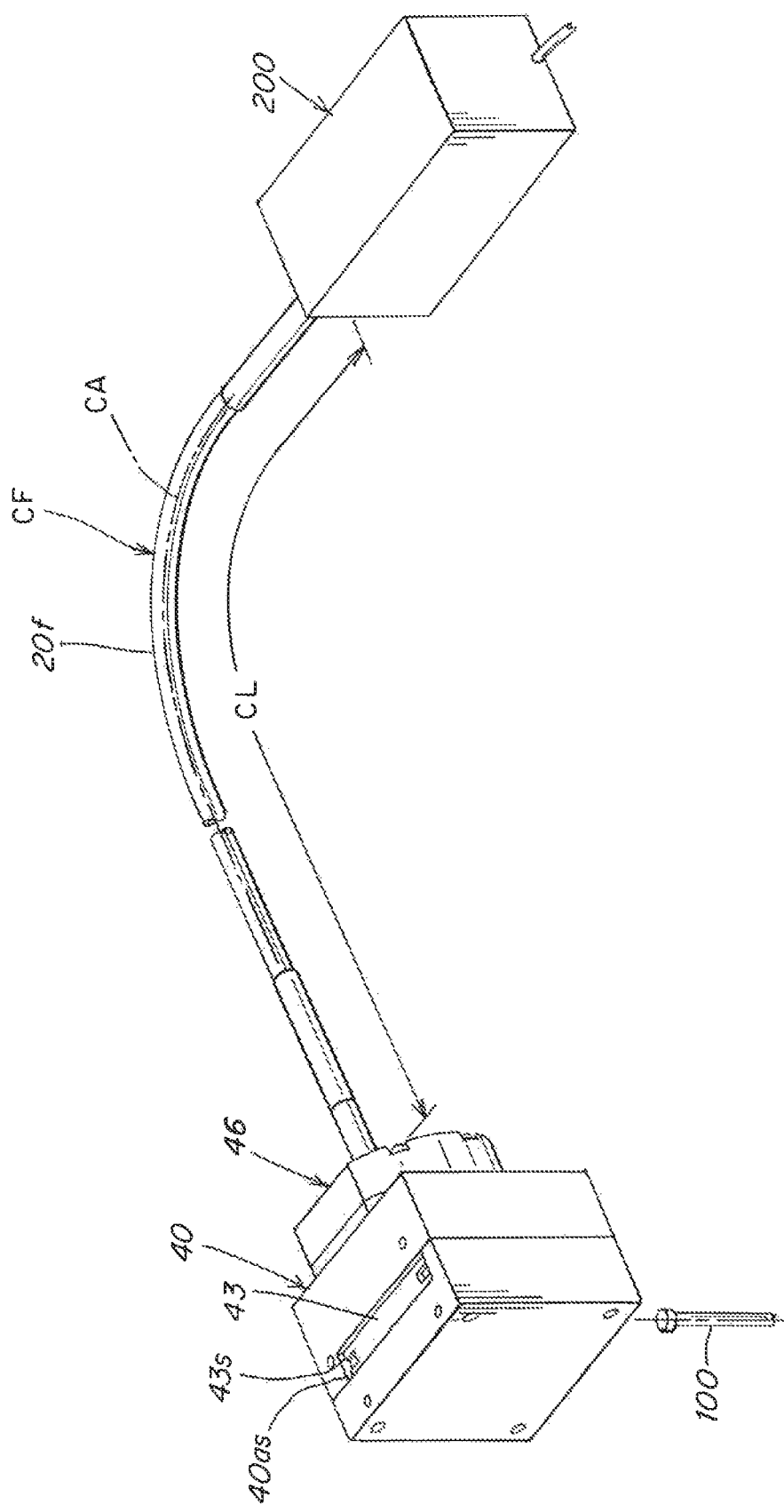
FIG. 4 is a view similar to FIG. 3 showing the actuator interconnected to the speed reducer via an elongated flexible shaft.

In an alternative embodiment, the elongated shaft 20 can comprise an elongated flexible shaft 20*f* as shown in FIG. 4 and described in detail in published application WO2017214387 the disclosure of which is incorporated by reference in its entirety as if fully set forth herein.

Figure 8:
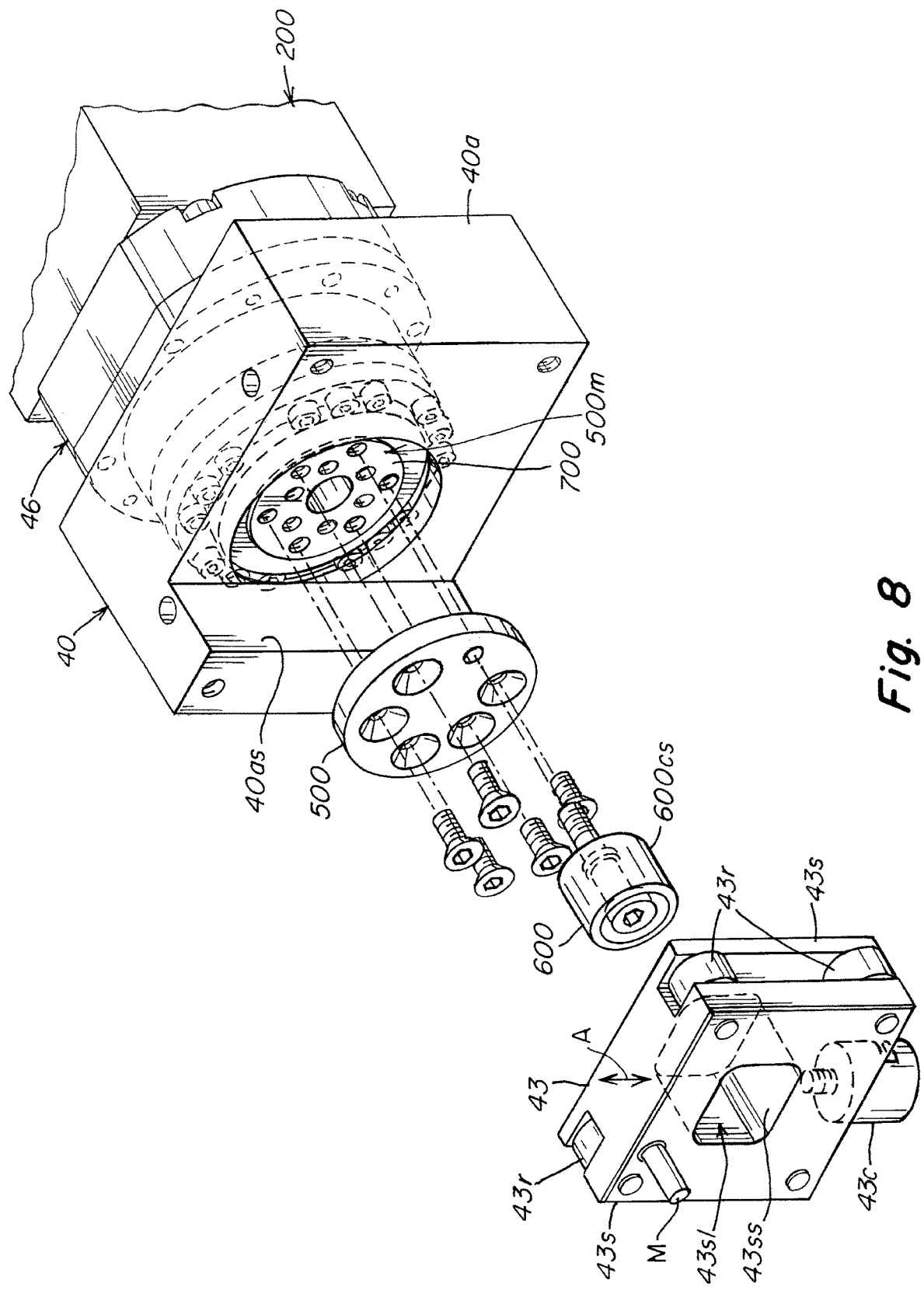
FIG. 8 is a view similar to FIG. 6 showing the forward mounting or drive disk, eccentric drive pin and rotary to linear movement components in exploded relationship.
Figure 9:
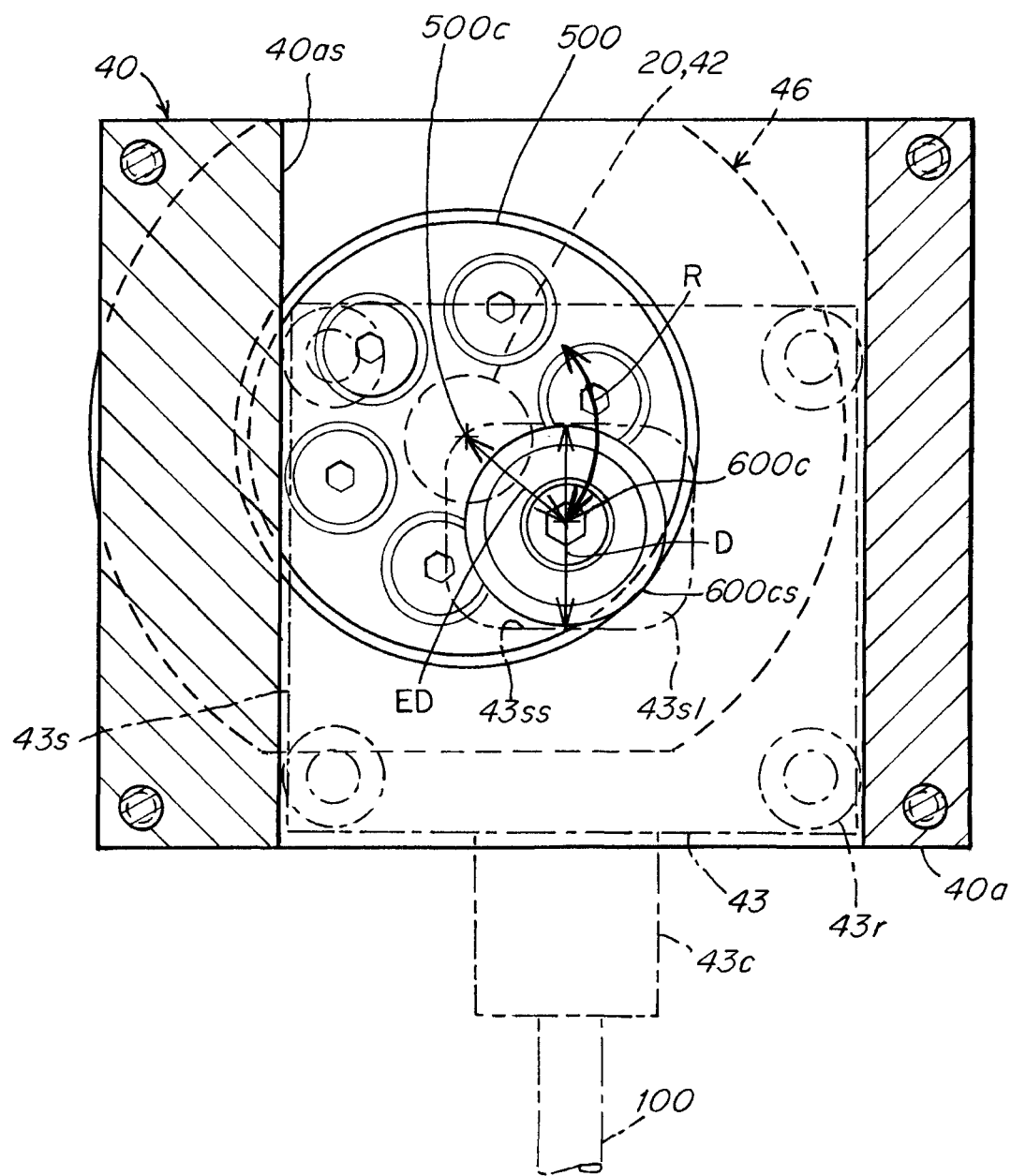
FIG. 9 is a front view of the FIG. 8 subassembly in assembled form showing the relationship of the speed reducing device to the forward mounting or drive disk when assembled.

The converter 40 can comprise a mount or alignment support 40*a* and a sled or slide 43 to which is interconnected a valve pin 100. The alignment support 40*a* has a guide surface 40*as* against which a complementary surface 43*s* of the sled or slide 43 slides as the sled 43 is driven reciprocally along a linear path A by the eccentric drive components that include the cam member 47, FIG. 1A. As shown in the embodiment of FIG. 8, the sled 43 has freely rotatably wheels 43*r* that facilitate upstream downstream sliding of the sled along surface 40*as*. In an alternative embodiment, wheels 43*r* are not necessary and the lateral surface 43*s* can be adapted to slide directly against surface 40*as* without wheels. As shown in the FIGS. 1, 1A embodiment, the alignment support 40*a* is attached to a rotation speed reducer 42. The converter 40 can be fixedly mounted to either the top clamp plate 140 as shown in FIG. 1 or to the heated manifold 60 as shown in FIG. 2.

The converter 40 includes a drive or mounting wheel or disc 500 having a rotational center 500*c* to which is axially attached or interconnected the rotatable drive shaft 12 of the actuator 20 either directly or indirectly via rotatably interconnected elongated shaft 20, 20*f* or a connector shaft such as a splined shaft 42*s*. With reference to FIGS. 5 through 9, the electrically powered rotatably driven rotor or drive shaft 12 of the motor is rotatably interconnected to the center 500*c* of the drive wheel or disc 500 of the rotary to linear converter 40 mechanism. An eccentrically mounted cam member 600, typically a freely rotatable disc or wheel, is mounted to the rotatably driven disc or wheel 500 a selected eccentric off center distance ED from the rotational center 500*c* of the driven wheel or disc 500.

The electrically powered drive of the motor rotor 12 drivably rotates R3 the drive wheel 500 at a controllably selectable speed and direction. As shown in FIGS. 5-9 as the drive wheel 500 of the converter 40 is rotatably driven, the eccentrically mounted cam member 600 rotates R3 around the center 500*c* of the drive wheel 500. As shown, the converter 40 includes a slide or sled 43 that is provided with a cam slot 43*sl* that is attached to the support 40*a* in an arrangement such that an outside circumferential surface 600*cs*, FIGS. 7A, 7B, 7C, of the cam member 600 engages a complementary interior cam surface 43*ss* of the slide or sled 43 member. The cam surface 43*ss* of the slide 43 is configured and adapted relative to the diameter D of the cam member 600 and the eccentric distance ED to enable the outside surface 600*cs* of the cam member 600 to forcibly engage the interior surface 43*ss* of the slide 43 and thus cause the slide 43 to be forcibly driven in a linear direction up and down or back and forth in or along a linear direction or axis A, FIGS. 5-9 as the cam member 600 is eccentrically drivably rotated R3 around the center of driven disc or wheel member 500. As shown, valve pin 100 is fixedly attached to the driven slide or sled member 43 in an arrangement such that the valve pin 100 is linearly driven together with the linear movement A of the slide 43.

Because of the eccentric mounting of the cam member 600, the linear or axial speed, A31, A32, A33 of the valve pin 100 and sled 43 along the linear path A varies A31, A32, A33 according to the rotational or angular position of the cam member 600 during the course of a constant rotational speed R3. The linear or axial speed A32 is at a maximum when the cam member 600 is at the ninety degree rotational position shown in FIG. 7B and at a lesser speed when the cam member 600 is at the 45 degree position of FIG. 7A and the 135 degree rotational position shown in FIG. 7C. Similarly with respect to the eccentric cam embodiment of FIGS. 5A, 5B, 5C, the linear or axial speed A32 of the valve pin 100 is at a maximum when the eccentric or eccentrically configured cam surface 600cs of disk 500 is in the ninety degree position, FIG. 5B, and the linear speeds A31 and A33 are less than the maximum when the eccentric cam surface 600cs is in the 0 degree, FIG. 5A, and 45 degree, FIG. 5C, positions.

Conversely because of the eccentric mounting of the cam member 600, the torque force, T31, T32, T33 exerted by the eccentric cam 600 on the valve pin 100 and sled 43 along the linear path A varies T31, T32, T33 according to the rotational or angular position of the cam member 600 the rotational speed R3 is constant. The torque force is at a minimum when the cam member 600 is disposed at the ninety degree rotational position shown in FIG. 7B and at a higher torque when the cam member 600 is at the 45 degree position of FIG. 7A and the 135 degree rotational position shown in FIG. 7C. Similarly with respect to the eccentric cam embodiment of FIGS. 5A, 5B, 5C, the torque force T32 exerted by the cam surface 600cs on the valve pin 100 is at a minimum when the eccentric or eccentrically configured cam surface 600cs of disk 500 is in the ninety degree position, FIG. 5B, and the torque force T31, T33 are greater than the minimum when the eccentric cam surface 600cs is in the 0 degree (at maximum torque force), FIG. 5A, and 45 degree, FIG. 5C, positions.

The absolute highest torque position is a position where the cam is disposed in the absolute maximum moment position which is typically the 0 degree position, MM1, or the 180 degree position, MM2. The 0 degree position is also shown in FIG. 5A, the absolute maximum moment and absolute minimum torque position.

FIGS. 6B, 6C, 6D, 6E, 6F show various preferred embodiments where rotation of the cam member 600 is limited to travelling through an arc segment that is something less than the full 360 degrees that the shaft or output device would otherwise rotate, such as between 70 degrees above and below the 90 and 270 degree positions, most preferably between 40 degrees above and below the 90 and 270 degree positions.

Figure 6:
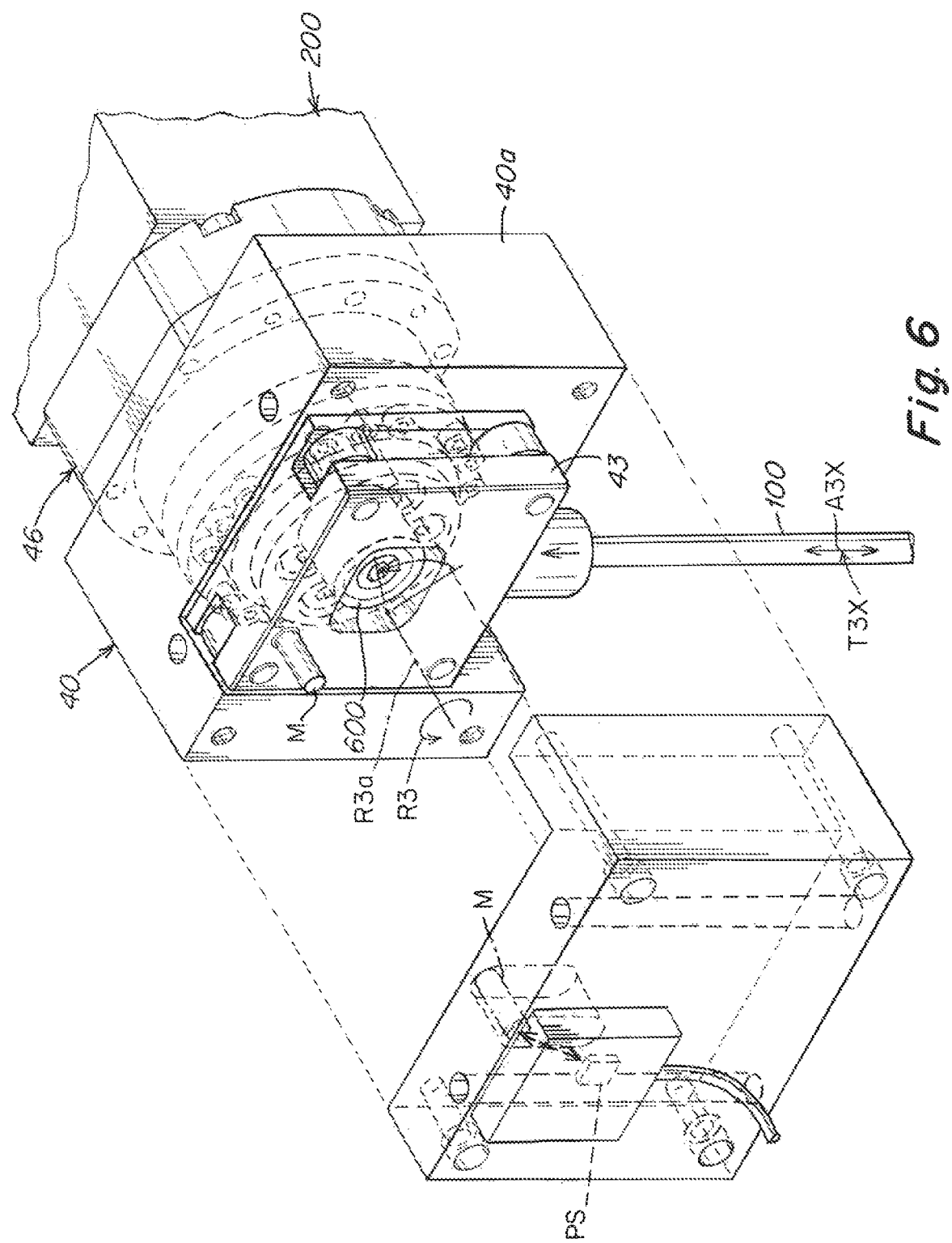
FIG. 6 is a top left partially exploded perspective view of a subassembly of an electric actuator, a strain wave gear rotation speed reducer such as shown in FIGS. 10-12D and an eccentrically driven rotary to linear drive sled converter.

In such embodiments, the cam device (600) is eccentrically disposed or mounted off center a selected distance (ED, R) from the output rotation axis (12a, R3a) in an arrangement such that when the shaft (12) or rotation device (16, 430, 500) is rotatably driven, the cam member (600) is eccentrically rotatably drivable around the output rotation axis (12a, R3a) to selectable angular positions above and below either a 270 degree position or a 90 degree position, FIGS. 6A, 6B, 6C.

Figure 6A:
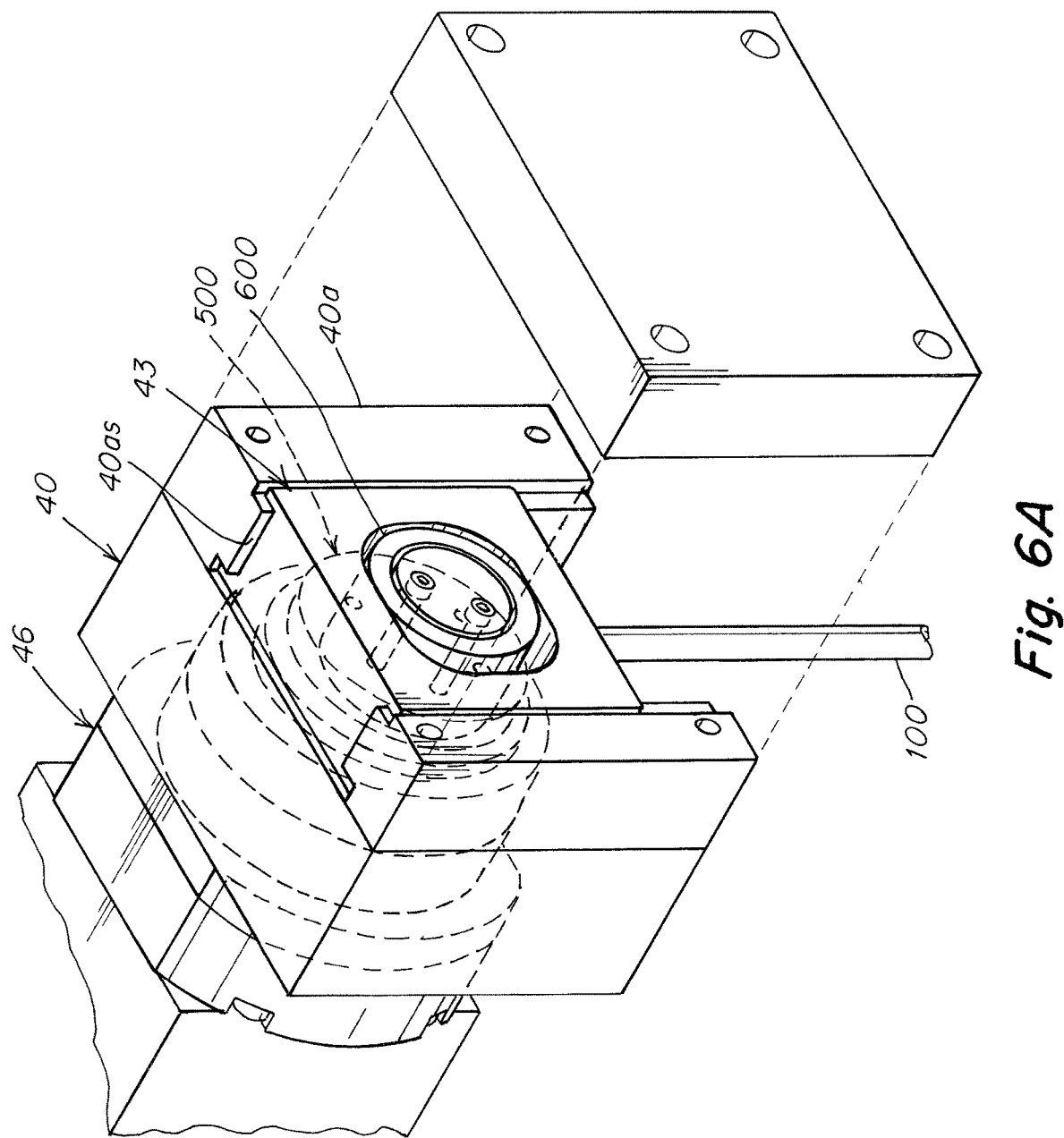
FIG. 6A is a top right partially exploded view similar to FIG. 6 showing an alternative configuration of the eccentrically driven rotary to linear sled components.
Figure 11:
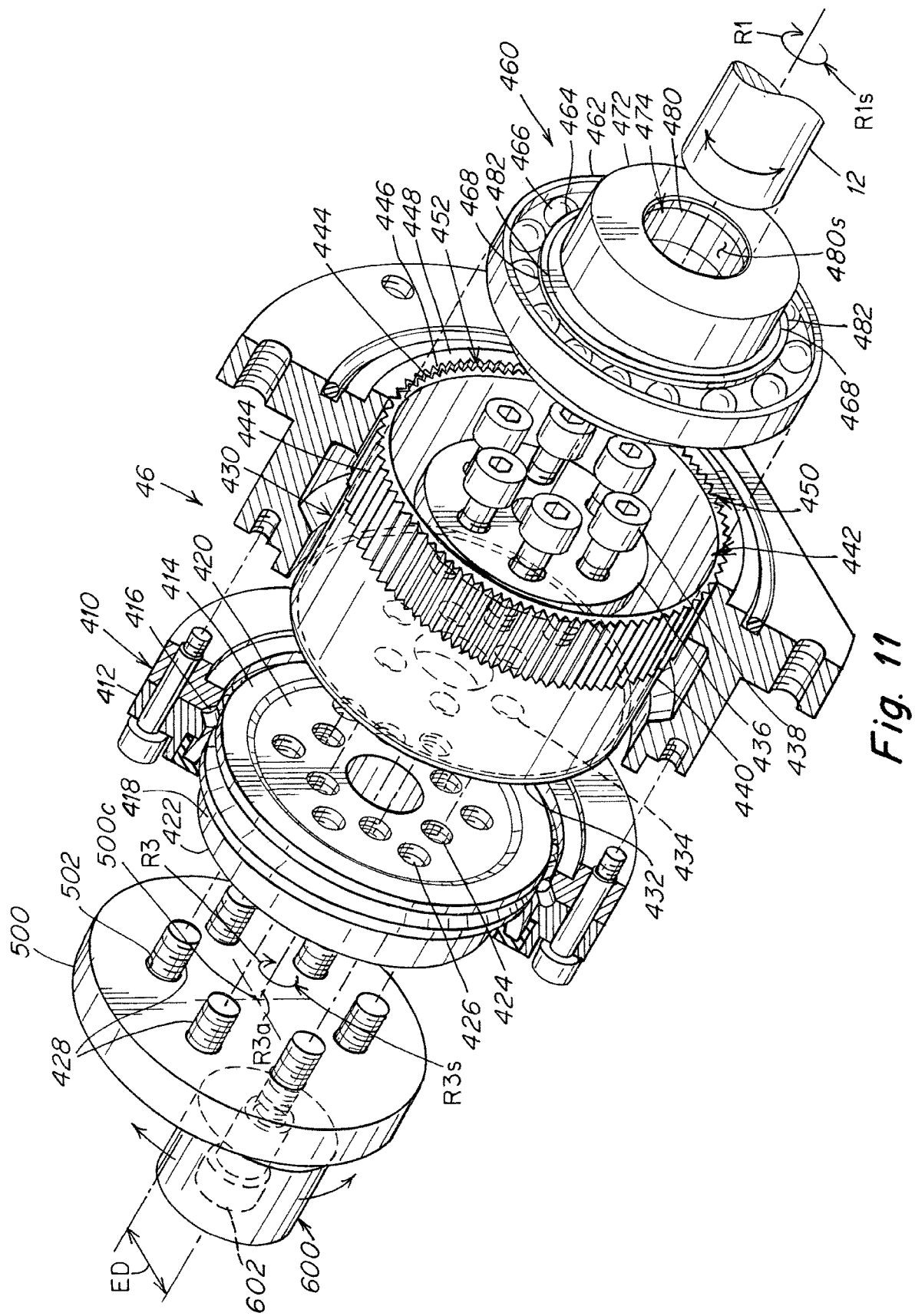
FIG. 11 is a top left perspective exploded view of the pin speed reducing, torque increasing or modifying device of the FIG. 10 device.

In such a preferred embodiment, a controller (1000), FIGS. 1, 6A, 11 is interconnected to the shaft (12) or output rotation device (16, 430, 500), the controller (1000) including an algorithm that controllably limits rotation of the shaft (12) or output rotation device (16, 430, 500) during the course of an entire injection cycle to angular positions between about 70 degrees above and 70 degrees below the 270 degree position, FIG. 6B, or between about 70 degrees above and 70 degrees below the 90 degree position, FIG. 6B. A preselected angular position between the 270 or 90 degree position and 70 degrees above defines a fully open valve pin position (PFO) and a preselected angular position between the 270 or 90 degree position and 70 degrees below defines a valve pin position where the gate is closed (PFC).

Figure 6B:
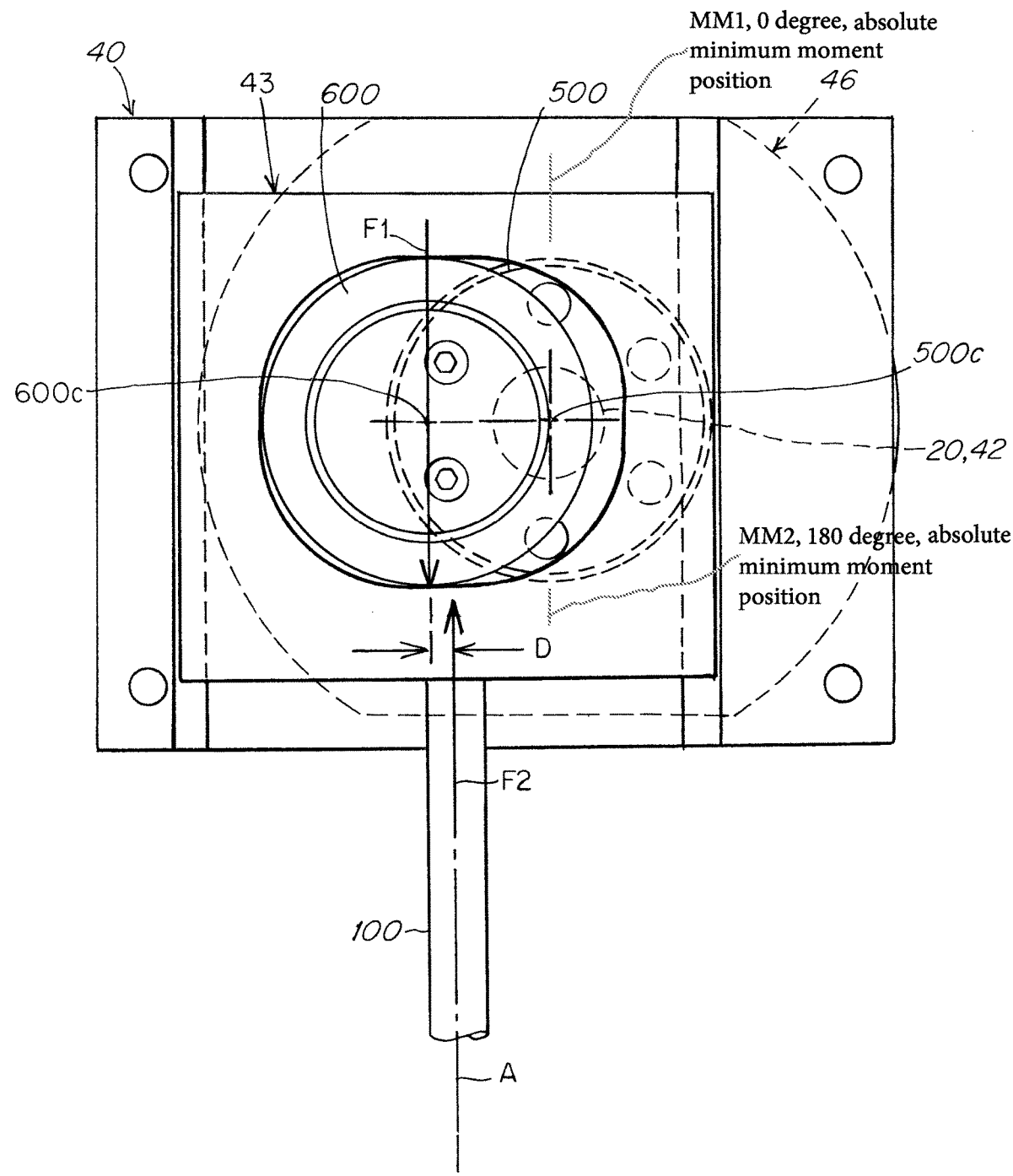
FIGS. 6B-6C are front views of the forward end rotating disk and associated eccentrically mounted cam member, eccentrically driven rotary to linear converter and the valve or drive pin of the FIGS. 5, 6, 6A subassemblies showing the rotation disk and the eccentric cam member in a 270 degree maximum moment midstroke rotational position and for illustration purposes showing in dashed lines an embodiment where in FIG. 6B the maximum rotational valve pin fully upstream open angular position is 70 degrees above or beyond 270 degree maximum moment position (at 340 degrees), and in FIG. 6C showing a position of 70 degrees before or below the maximum moment 270 degree midstroke position (at 200 degrees) at which position the valve pin closes the gate or in a closed gate position.
Figure 6C:
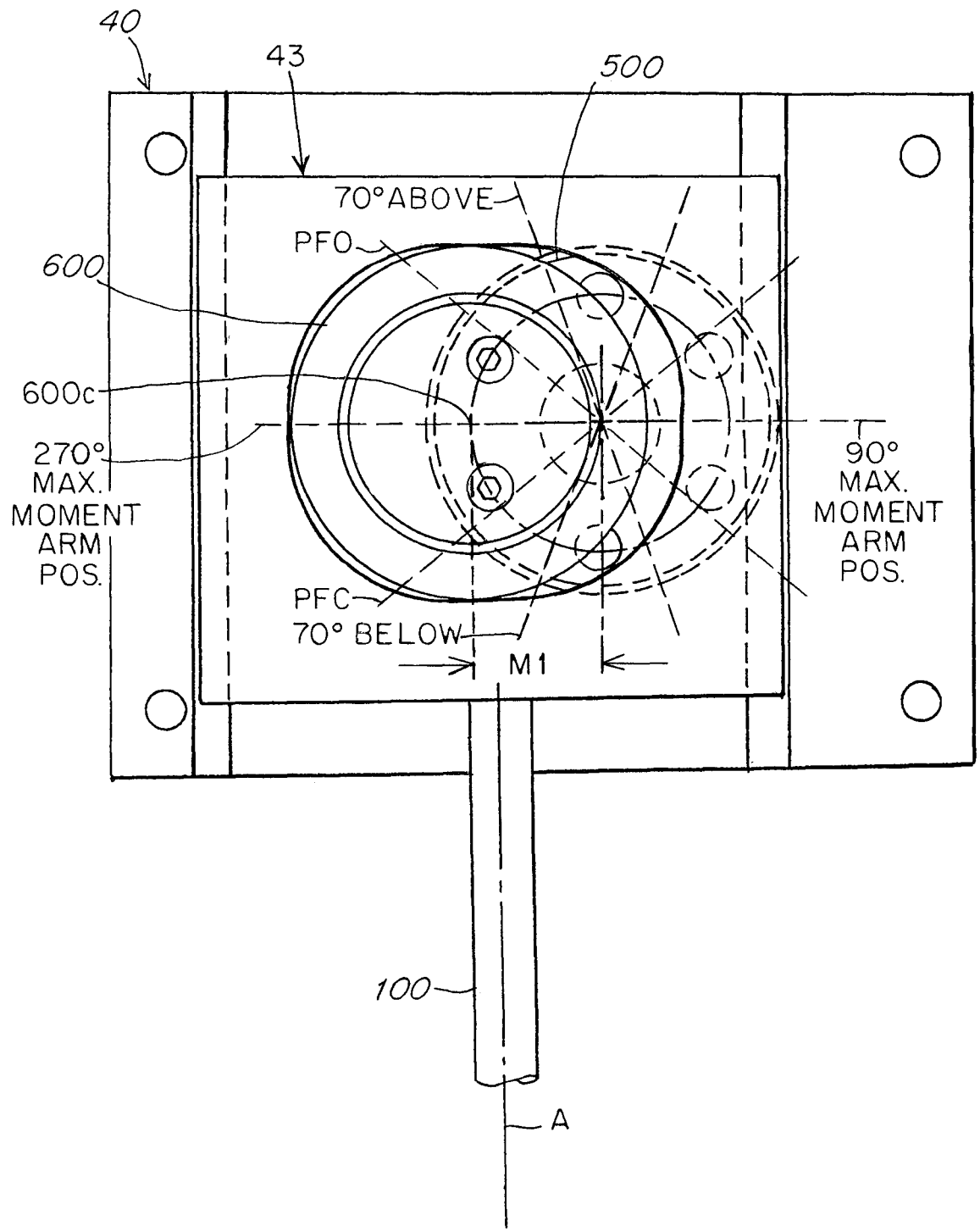

As shown in FIG. 6B, slide, sled or linear travel device (43, 40) is adapted to guide the valve pin along a linear path of travel (A, AS). The rotary to linear converter device (40, 43) can include stops or linear travel limiters (not shown) that are fixed to the alignment supports 40a of the rotary to linear converter 40 or otherwise fixedly attached relative to the sled 43. The stops are typically mounted and adapted to limit linear travel of the slide or sled 43 such that when the cam member 600 is rotated to a preselected maximum angular position 70 degrees or less above or below the 270 (or 90) degree position, travel of the cam 600 and the valve pin is stopped. Typically, such preselected maximum angular positions above and below the 270 or 90 degree positions are selected so as to define a corresponding preselected valve fully open position (PFO) and a corresponding valve fully closed position (PFC).

Most preferably, the algorithm controllably limits rotation of the shaft (12) or output rotation device (16, 430, 500) during the course of an entire injection cycle to angular positions between about 40 degrees above and 40 degrees below the 270 degree position or between about 40 degrees above and 40 degrees below the 90 degree position wherein a preselected angular position between 40 degrees above the 270 or 90 degree position defines the fully open valve pin position (PFO) and a preselected angular position 40 below the 270 or 90 degree position defines the valve pin position where the gate is closed (PFC).

An alternative manner of describing how rotation of the cam 600 is limited is that the algorithm of the controller 1000 limits rotation of the shaft (12) or output rotation device (16, 430, 500) to selectable angular positions that create a moment arm M that extends between a selected minimum moment arm M2, FIG. 6D, and a selected maximum moment arm, M1, FIG. 6C, the selectable angular positions being between 70 degrees above and 70 degrees below the preselected angular position (270 degrees, FIG. 6B) that corresponds to the selected maximum moment arm M1. Typically the absolute maximum moment arm M1 exists when the rotational or angular position of the cam 600 is disposed at 270 degrees or 90 degrees, although other angular positions could be preselected to define or correspond to the absolute maximum moment arm position.

Figure 6D:
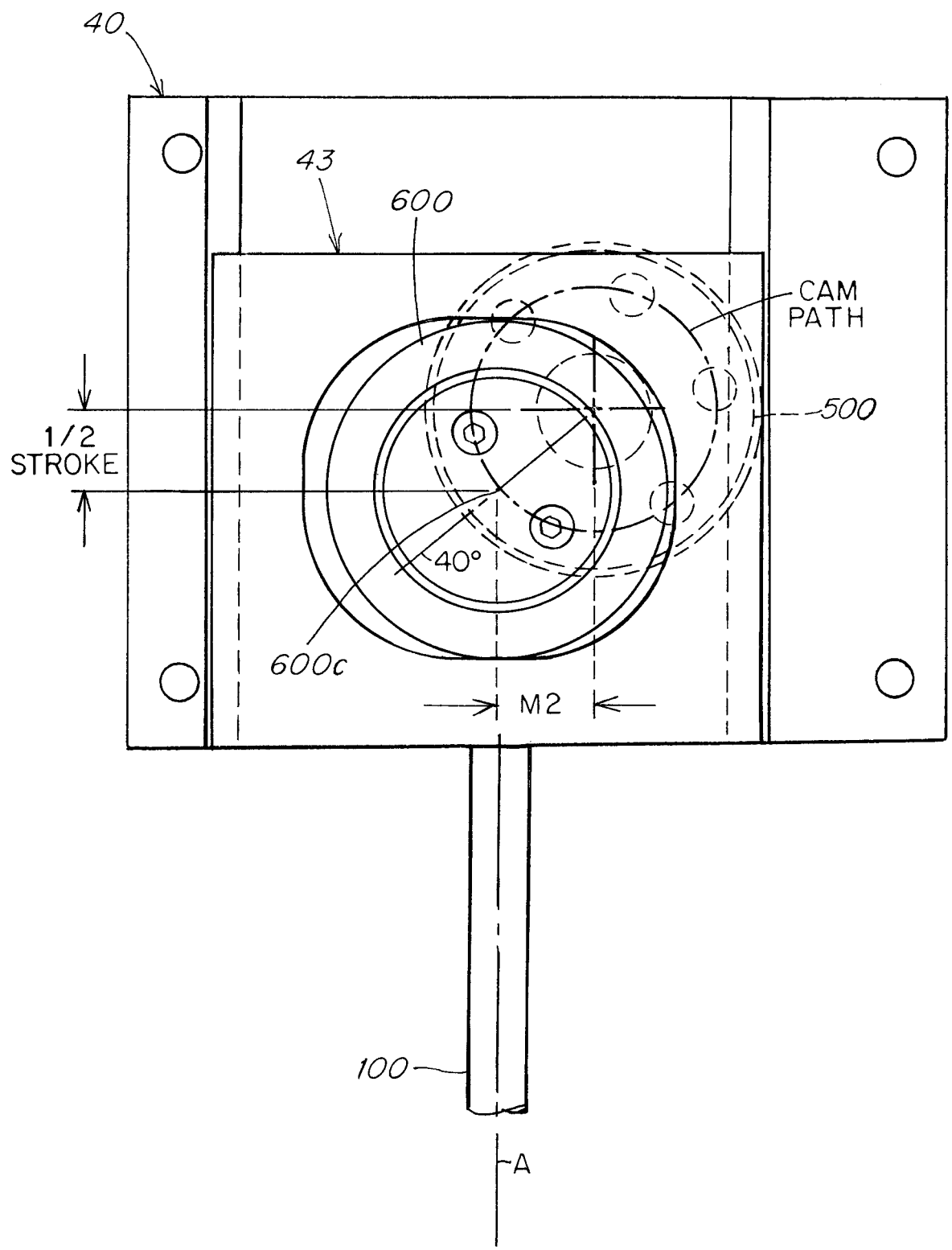
FIGS. 6D, 6E are front views similar to FIGS. 6B, 6C specifically showing an alternative embodiment where in FIG. 6D the maximum rotational valve pin fully upstream open angular position is 40 degrees above or beyond 270 degree maximum moment position (at 310 degrees), and in FIG. 6E showing a position of 40 degrees before or below the maximum moment 270 degree midstroke position (at 230 degrees) at which position the valve pin closes the gate or in a closed gate position.

FIG. 6D shows the cam member 600 rotated to a position 40 degrees below 270 degrees at which the valve pin is disposed in a fully gate closed position where flow of fluid through the gate is stopped. As discussed below, a frictional or mechanical stop device can be provided such that the valve pin is mechanically stopped in the valve closed position.

Figure 6E:
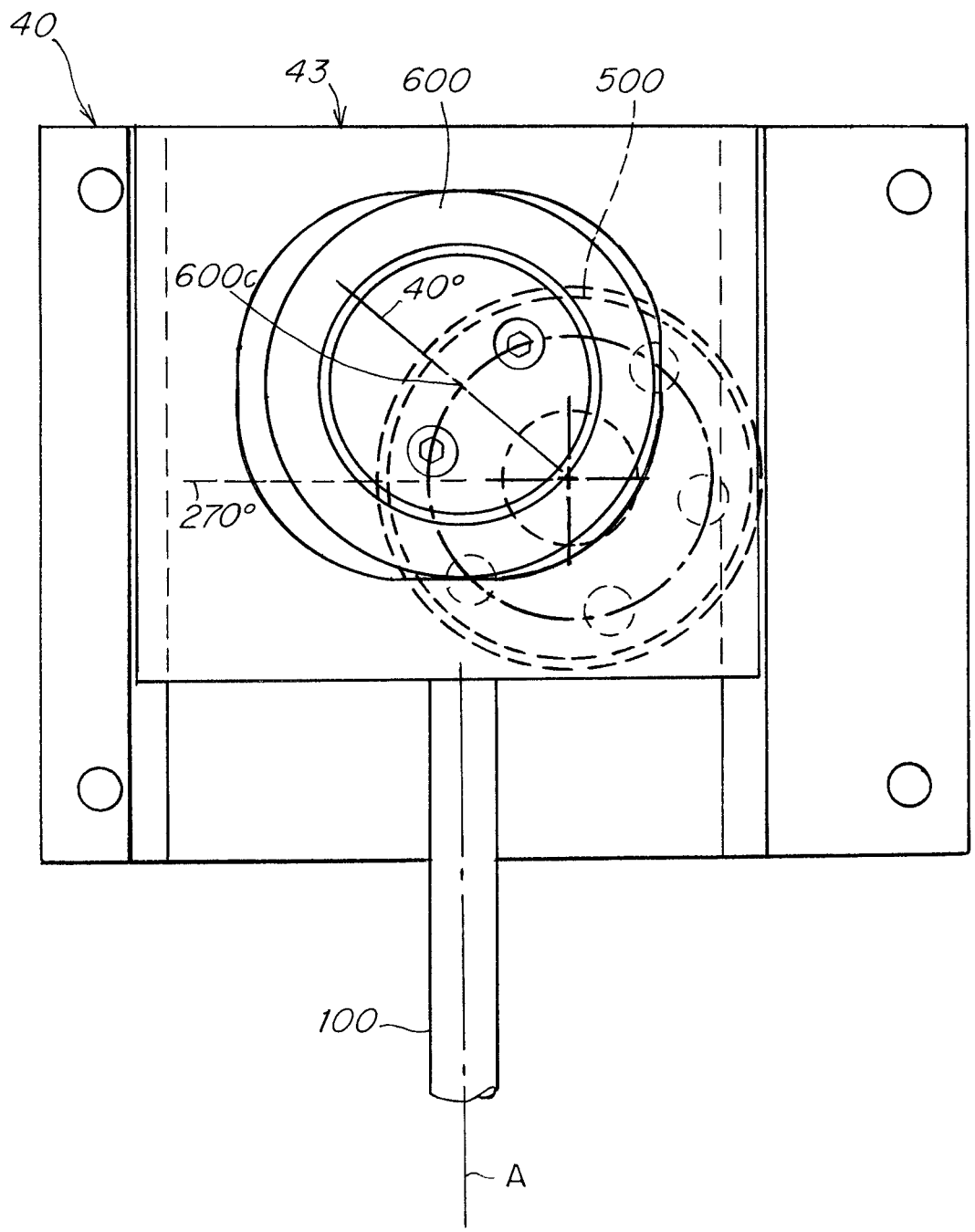

FIG. 6E shows the sled 43 rotated to an angular position of 40 degrees above the 270 degree rotational position at which the valve pin is defined and selected as being disposed in the fully valve pin and gate fully open position. As discussed below, a frictional or mechanical stop device can be provided such that the valve pin is mechanically stopped in the valve fully open position.

Similarly FIG. 6D shows the sled 43 rotated to an angular position of 40 degrees below the 270 degree rotational position at which the valve pin is defined and selected as being disposed in the valve pin and gate fully closed position. As discussed, a frictional or mechanical stop device can be provided such that the valve pin is mechanically stopped in the valve fully closed position.

The 270 degree position is one position at which the cam member 600 and associated elements of the drive system 200 is disposed at its absolute maximum moment arm position. The mirror image of the FIGS. 6C, 6D and 6E embodiments is where the cam member is rotated to a 90 degree rotational position at which the cam member 600 and associated elements of the drive system 200 are also disposed at an absolute maximum moment arm position.

Figure 6F:
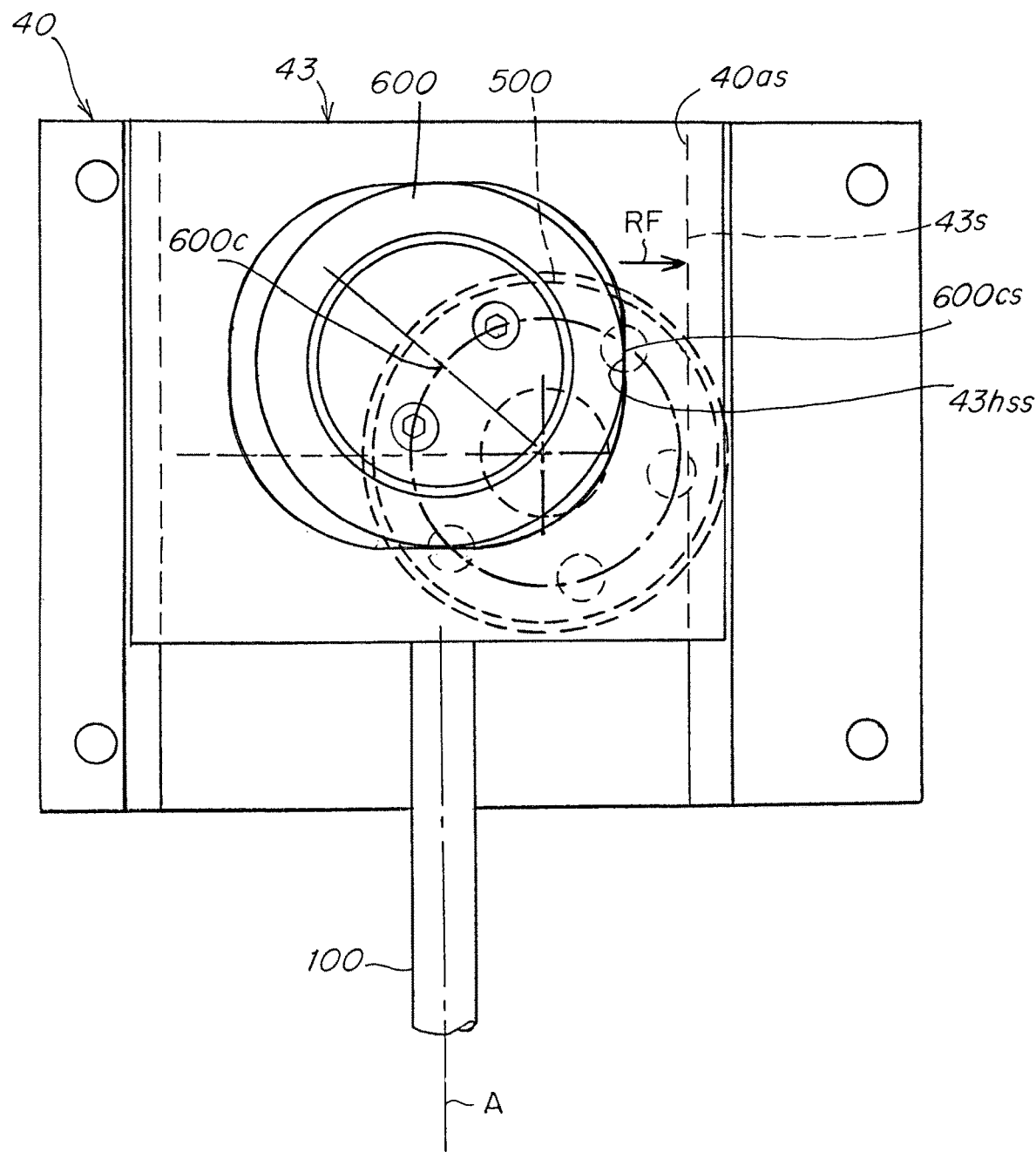
FIG. 6F is a top front perspective view of the forward end rotating disk and associated eccentrically mounted cam member, rotary to linear converter and drive pin of the speed reducer of the FIGS. 5, 6 subassembly showing the outer circumferential surface 600cs of the cam member in an angular position that is adapted to cause the surface 600cs to engage and forcibly push against the travel member surface 43hss which in turn causes the outer surface 43s of travel member 43 to forcibly engage against a complementary surface 40as of the support which causes the slide, sled or travel member 43 to come to a hard stop.

FIGS. 6E, 6F show an embodiment where the cam member 600, the slide 43, the mount 40 are mounted and adapted such that the outer circumferential surface 600*cs* of the cam member 600 is drivable to a selectable angular position that is adapted to cause the cam outer surface 600*cs* to engage and forcibly push against the slide or sled or travel member surface 43*hss* with a degree of radially directed force RF that causes the outer surface 43*s* or bearings disposed between the outer surface 43*s* of the travel member 43 and opposing surface 40*as* to forcibly engage against the complementary surface 40*as* of the support 40 such that the slide, sled or travel member 43 is mechanically forced to come to a hard stop as a result of frictional engagement between the outer surface 43*s* or bearings disposed between the outer surface 43*s* of the travel member 43 and opposing surface 40*as* of the support 40. As can be readily imagined, balls, ball bearings or the like can be disposed between the surfaces 43*s* and 40*as* for enabling ready linear sliding of one surface along the other in which case the force RF created by the hard stop rotation of the cam 600 would be exerted between the balls, ball bearings or the like and the surfaces 43*s* and 40*as* to effect a frictional force that mechanically prevents the surfaces 43*s* and 40*as* from moving relative to each other and thus mechanically stops linear movement of the slide or sled 43 and thus also stops movement of the valve pin 100.

Alternatively an outer surface 43*s* of the slide 43 could be adapted to frictionally engage against the surface of another fixedly mounted stop member (not shown) that is fixedly interconnected to the assembly 200 relative to the sled, slide or linear travel member 43. The angular or linear location of the hard stop position is typically selected to correspond to the angular positions of the cam member 600 that correspond to the linear valve pin open PFO and valve pin closed PFC positions.

The selectable angular positions above and below the maximum moment arm position M1 are preferably selected to be between about 40 degrees above and about 40 degrees below the angular position that corresponds to the selected maximum moment arm M1 position, such positions being alternatively between about 70 degrees above and 70 degrees below the angular position that corresponds to the selected maximum moment arm M1 position.

Figure 13A:
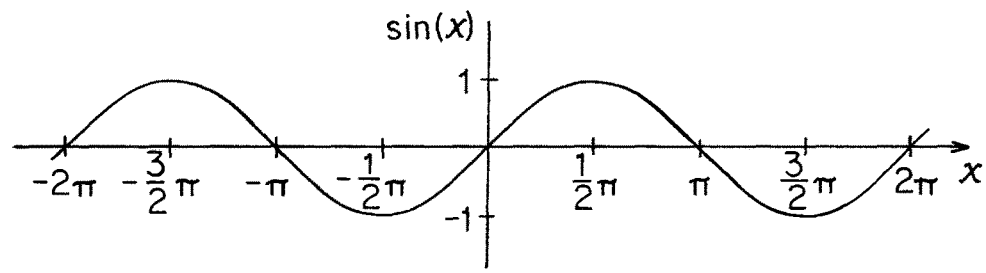
FIG. 13A is an example of a profile of speed of valve pin movement versus rotational position of the vertical portion of an eccentric element of a speed reducing, torque increasing component driven at constant speed by a motor in an apparatus according to the invention.
Figure 14A:
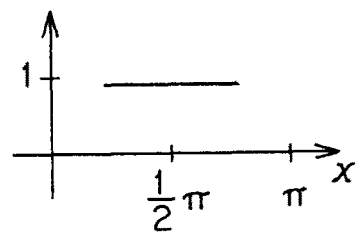
FIG. 14A is a profile of constant speed of valve pin movement versus position of a conventional non eccentric rotary to linear drive system driven at constant rotational speed by a motor in an injection molding system.
Figure 14B:
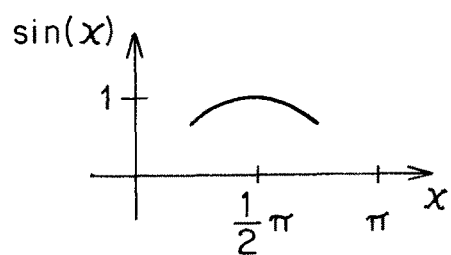
FIG. 14B is an example of a profile of variable speed of valve pin movement versus rotational position of an eccentric rotary to linear drive system driven at constant rotational speed by a motor in an injection molding system.
Figure 16A:
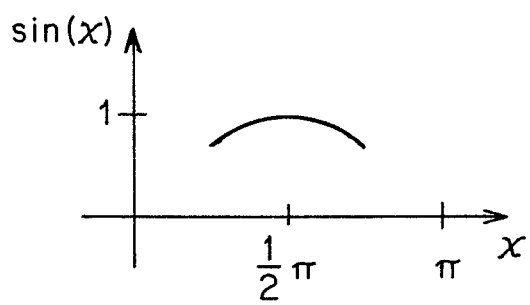
FIG. 16A is a profile similar to FIG. 14B.

FIGS. 13A, 14B, 16A show how the linear or axial speed A3X of the sled and valve pin vary with all 0-360 degree rotational positions of the cam member 600 when the rotational speed of the mounting or drive disk 500 is constant.

Figure 7A:
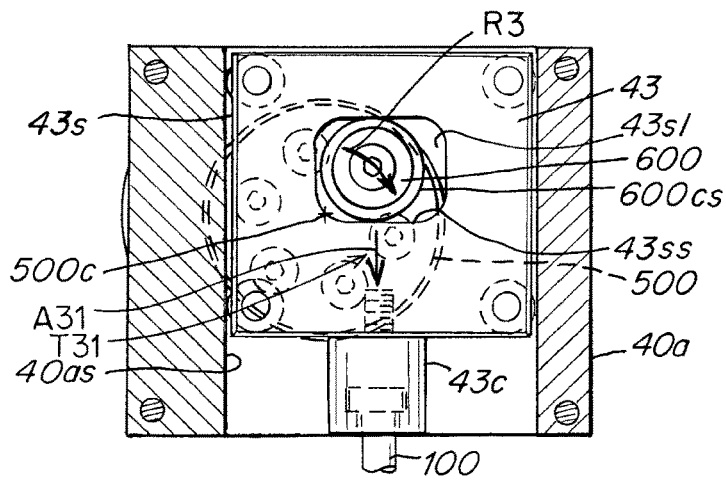
FIGS. 7A, 7B, 7C are a series of front views of the forward end rotating disk and associated eccentrically mounted drive pin of the speed reducer element of the FIGS. 5, 6 subassembly showing the rotation disk and eccentric pin in a series of successive rotational positions during the course of an injection cycle.
Figure 7B:
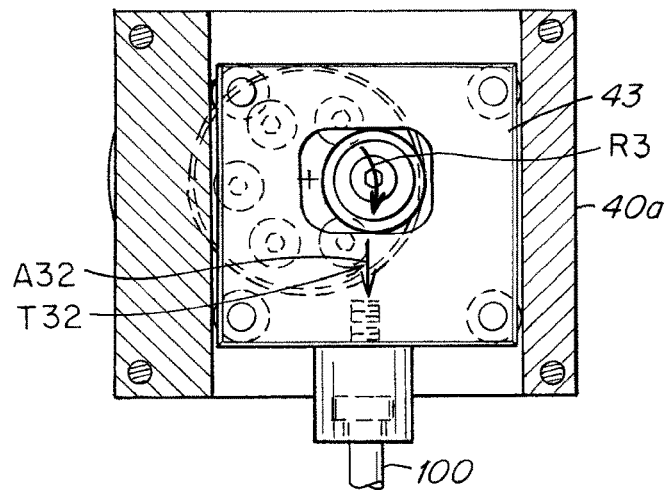
Figure 7C:
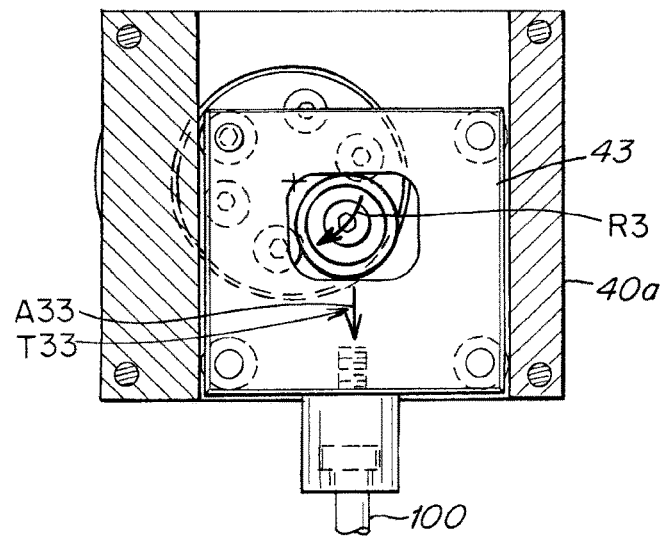
Figure 13B:
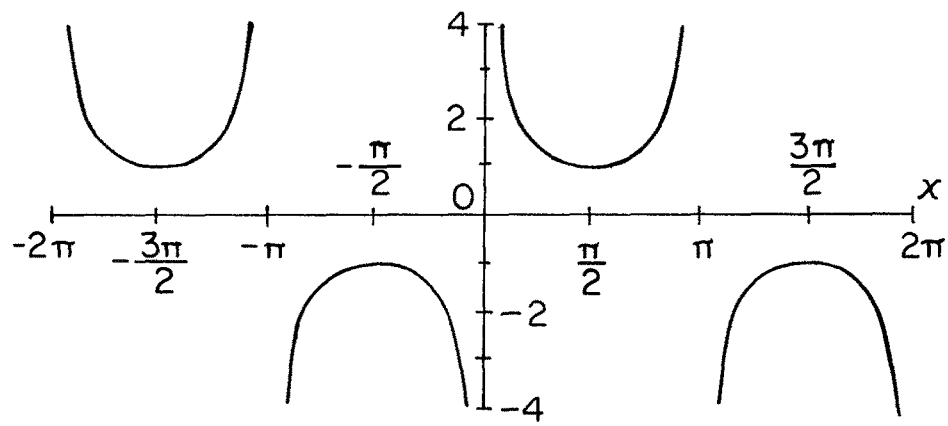
FIG. 13B is an example of a profile of force exerted on a driven valve pin versus vertically generated rotational position by an eccentric element of a speed reducing, torque increasing component driven at constant speed by a motor in an apparatus according to the invention.
Figure 15A:
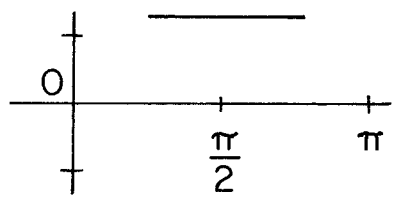
FIG. 15A is a profile similar to FIG. 14A.
Figure 15B:
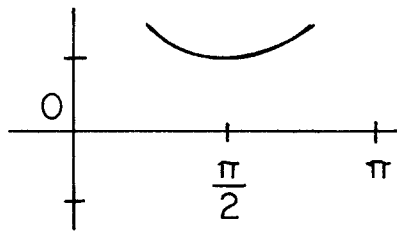
FIG. 15B is a profile similar to FIG. 14B.
Figure 16B:
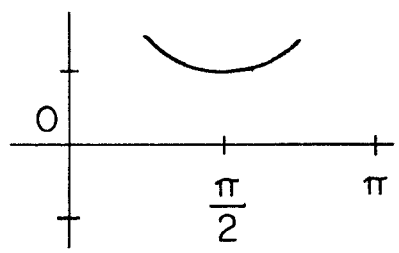
FIG. 16B is a profile similar to FIG. 15B.

Similarly the torque force T3X, FIG. 6, exerted by the eccentric cam 600 on the valve pin 100 in different rotational positions such as in FIGS. 7A, 7B, 7C varies T31, T32, T33. FIGS. 13B, 15B, 16B show how the torque force T3X of the sled and valve pin vary with all 0-360 degree rotational positions of the cam member 600 when the rotational speed R3 of the mounting or drive disk 500 is constant.

When the system 5 is assembled and the heated manifold 60 is heated to a typical high operating temperature, the manifold 60 body will tend to physically expand in size thus causing translational movement of the body of the manifold 60 relative to the top clamp plate 140 and the mold body 70. Similarly components of the valve assembly such as the converter housing 40*h* and valve pin 100 that may be mounted to the heated manifold will translationally move in several directions such as laterally LS, axially AS and from front to back FBS, FIG. 2, namely in a direction in and out of the page as shown in FIG. 2, while the motor 200 is stationarily mounted on the top clamp plate 140 or to another stationary structure of the system 5. To accommodate such in and out or front to back FBS movement in an embodiment where the actuator 200 is remotely mounted relative to the converter 40, the interconnecting joints 15, 30 are flexible such that the joints 15, 30 are preferably adapted to enable the shaft 20 to pivot in or along the axial AS or lateral LS or FBS directions or axes together with movement of the housing 40 or motor 200 along the same AS, LS or FBS directions or axes. Joints 15, 30 can comprise a universal joint that include hinges such as hinges 15*h*1, 15*h*2 that may be pivotably connected to each other by a cross shaft 15*cs*. A cross shaft connection can connect the hinge such that the two hinges that make up a complete hinge can co rotate with each other along their respective rotational axes and simultaneously also to pivot in the FBS axis or direction relative to each other around the axis of the connecting cross shaft while still continuing to co rotate when the shaft 20, particularly a rigid shaft, is being rotatably driven. Thus any components that may be mounted to the manifold 60 such as the converter housing 40 or valve pin 100 may translationally move relative to the motor 200 when the system is brought to operating temperature.

As shown in FIG. 8 the driven wheel or disc component 500 is typically mounted on the forward face 500*m* of the driven rotating disc or wheel component 700 of a speed reducing device 42 which is reduced in rotational speed relative to the rotational speed of the rotor or drive shaft 12 of the actuator 200.

The rotational speed reducing device 46 preferably comprises a strain wave gear that includes a rotatable elliptical or other non circular shaped such as a three node containing shaped disk or ring that generates a reduction in rotation speed output relative to the rotation speed of the input rotor. The strain wave gear is typically comprised of three basic components: a wave generator, a flex spline and a circular spline. The wave generator is typically made up of an elliptical or other non circular shaped such as a three node containing shaped disk called a wave generator plug and an outer ball bearing, the outer bearing having an elliptical or other non circular shaped such as a three node containing shape as well. The flex spline is typically shaped like a shallow cup. The circumferential side walls of the spline are very thin, but the bottom is relatively rigid. This results in significant flexibility of the walls at the open end due to the thin wall, and in the closed side being quite rigid and able to be tightly secured to an output shaft. Teeth are positioned radially around the outside of the flex spline. The flex spline fits tightly over the wave generator, so that when the wave generator plug is rotated, the flex spline deforms to the shape of a rotating ellipse or other non circular shape such as a three node containing shape and does not slip over the outer elliptical or other non circular shaped such as a three node containing shaped ring of the ball bearing. The ball bearing lets the flex spline rotate independently to the wave generator's shaft. The circular spline is a rigid circular ring with teeth on the inside. The flex spline and wave generator are placed inside the circular spline, meshing the teeth of the flex spline and the circular spline. Because the flex spline is deformed into an elliptical or other non circular shaped such as a three node containing shape, its teeth only actually mesh with the teeth of the circular spline in two regions on opposite sides of the flex spline (located on the major axis of the ellipse or other non circular shaped such as a three node containing shape).

As the wave generator plug rotates, the flex spline teeth which are meshed with those of the circular spline change position. The major axis of the flex spline's ellipse or other non circular shaped such as a three node containing shape rotates with wave generator, so the points where the teeth mesh revolve around the center point at the same rate as the wave generator's shaft. The key to the design of the strain wave gear is that there are fewer teeth (often for example two fewer) on the flex spline than there are on the circular spline. This means that for every full rotation of the wave generator, the flex spline would be required to rotate a slight amount (two teeth in this example) backward relative to the circular spline. Thus the rotation action of the wave generator results in a much slower rotation of the flex spline in the opposite direction. For a strain wave gearing mechanism, the gearing reduction ratio can be calculated from the number of teeth on each gear.

Figure 10:
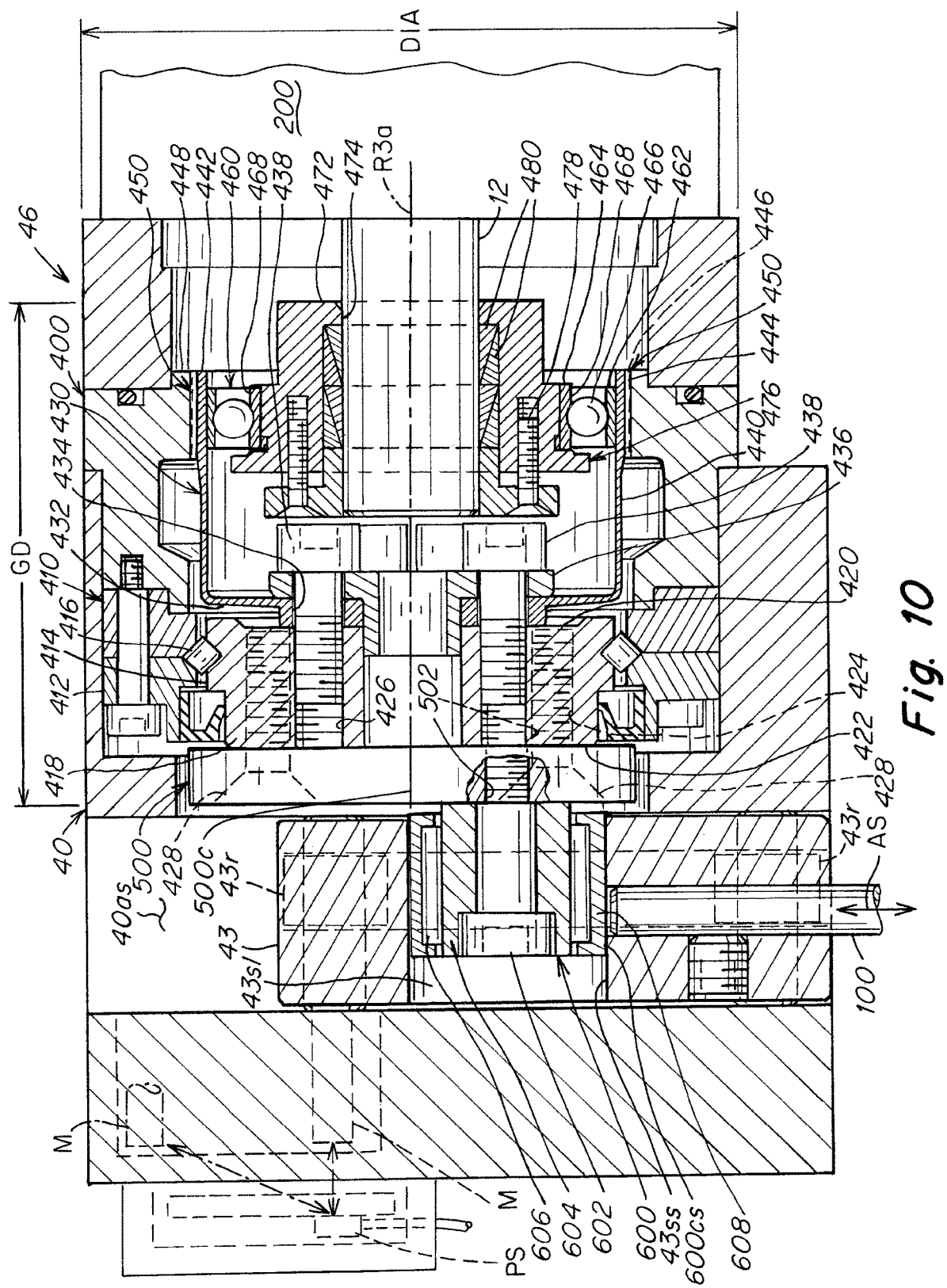
FIG. 10 is side sectional view of the FIG. 8 subassembly in assembled form.

The apparatus most preferably includes a position sensor EN, FIGS. 1, 2 that senses a rotational position of the rotor 12 of the electric actuator or motor 200 or a position sensor PS, FIG. 10, that senses the linear position of the valve pin 100 or a linearly moving member such as sled 43 that moves together with linear movement of the valve pin 100. In the FIGS. 1, 2 embodiment, the position sensor EN typically comprises an encoder that senses the rotational position of the rotor 12 or a rotating element of the strain wave gear 400 such as the flexible spline 430 which in turn corresponds to the linear position of the pin 100. In the FIG. 10 embodiment the linear position sensor PS typically comprises a Hall Effect sensor (HES or H.E.S.) that senses a change in a magnetic field generated by a magnet that is mounted to and linearly moves together with linear movement of the pin 100, the sensor converting change in magnetic field to position of the valve pin 100. As shown in FIG. 10 the magnet M is mounted to the sled 43 and moves linearly together therewith. The detector PS thus senses any magnetic field generated by the magnet M and any changes in the field as the magnet moves linearly relative to the linear position of the sensor PS which is stationarily mounted relative to the sliding sled 43 in field detection proximity to the magnet M.

Figure 12A:
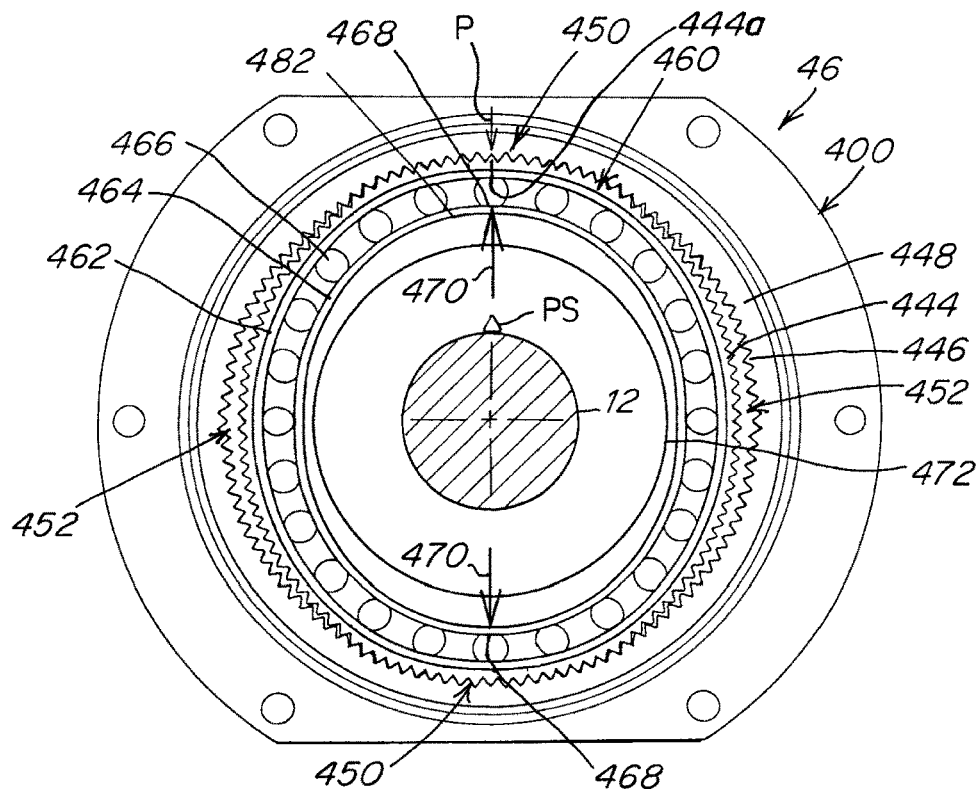
FIG. 12A is a front view of the speed reducing device assembly showing the thin walled rotatable bearing component mounted within the flexspline component mounted within the circular spline component with the bearing and flexspline components disposed in an initial 0 degree position.
Figure 12B:
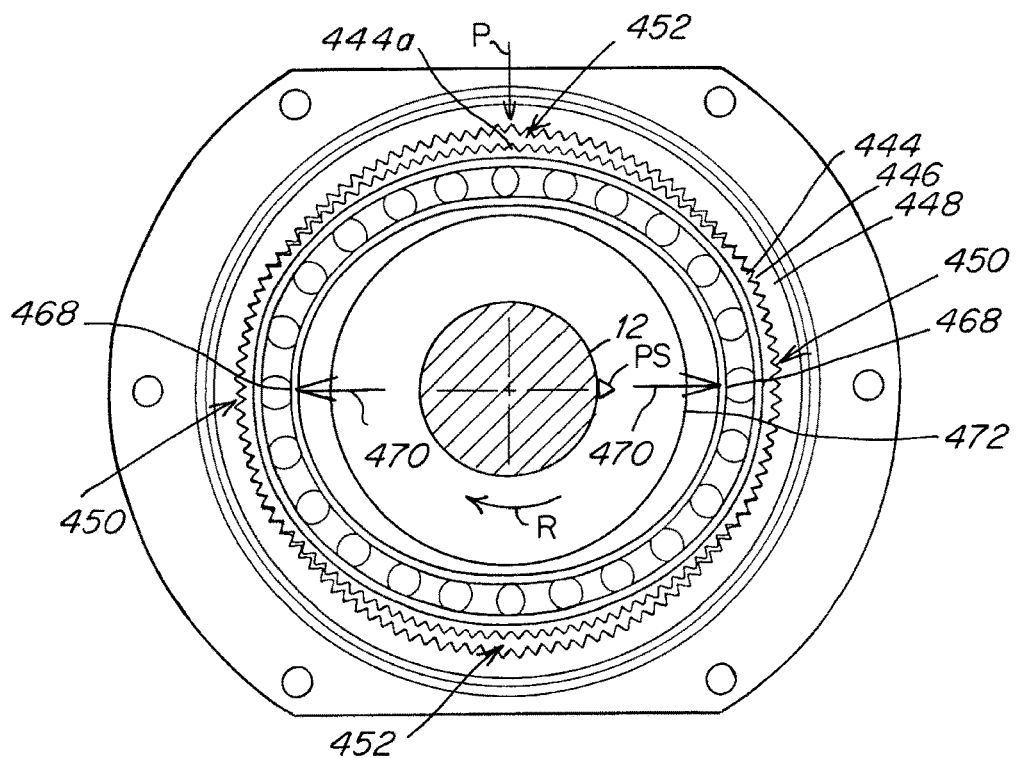
FIG. 12B is a view similar to FIG. 12A showing the bearing and flexspline components disposed in a subsequent 45 degree position.
Figure 12C:
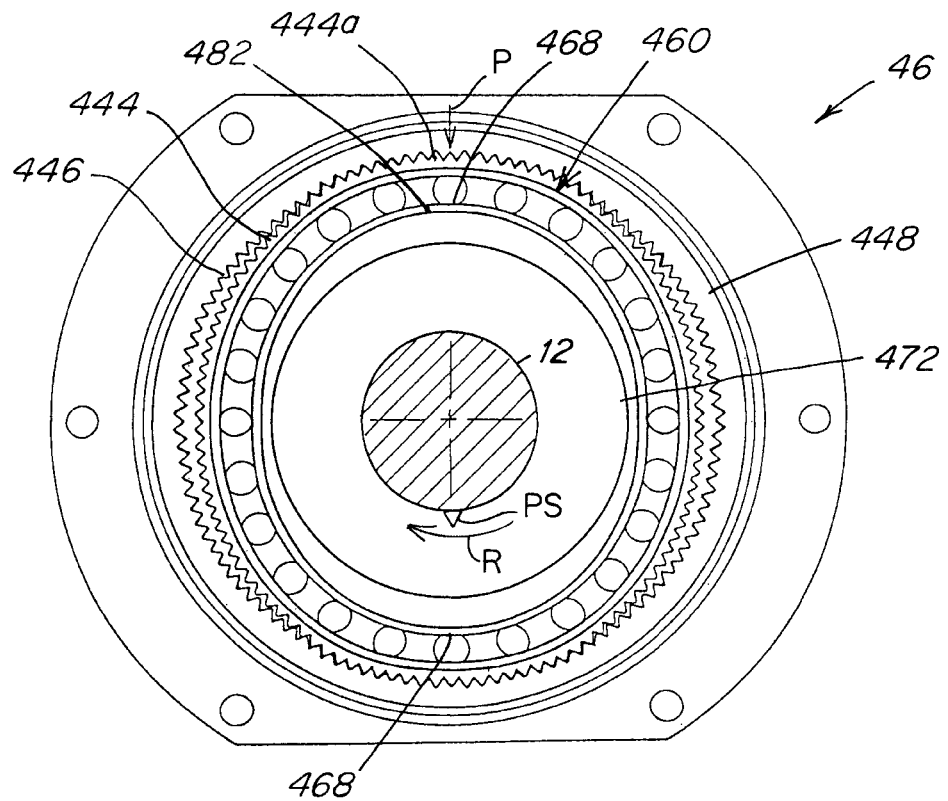
FIG. 12C is a view similar to FIG. 12A showing the bearing and flexspline components disposed in a subsequent 180 degree position.
Figure 12D:
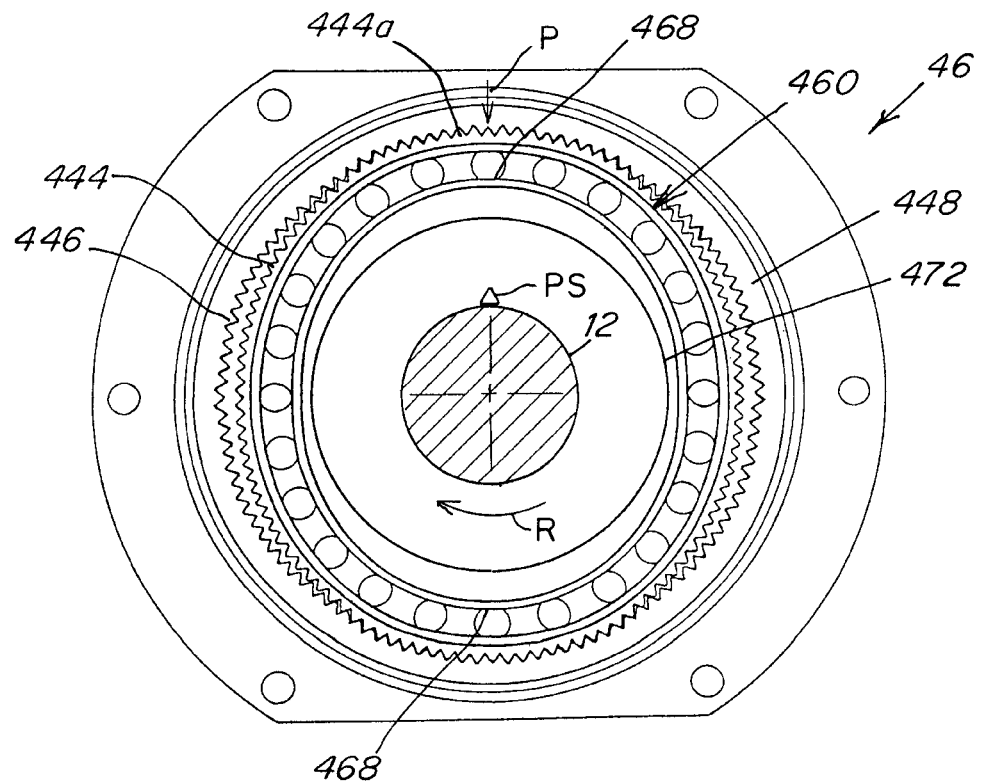
FIG. 12D is a view similar to FIG. 12A showing the bearing and flexspline components disposed in a fully completed 360 or 0 rotational degree position.

In the embodiments shown, the strain wave gear 400, FIGS. 10, 11, 12A, 12B, 12C, 12D is comprised of the wave generator or thin walled bearing 460 that is mounted within and against the inner circumferential wall of the flex spline 430 that is in turn mounted within the inner splined circumference of a rigid circular spline 448 as shown for example in FIGS. 10, 11, 12A, 12B, 12C, 12D. FIG. 12A is a schematic end view of the speed reducer assembly of FIG. 11 at a starting point of a revolution of the actuator shaft 12. A shaft position indicator PS shows that nodes 482 formed on the hub 472 are vertically aligned 180 degrees apart from each other forming an elliptical or other non circular shaped such as a three node containing shaped circumferential surface. An inner bearing race 464 pressed on the elliptical or other non circular shaped such as a three node containing surface of the hub 472 either having or taking a shape complementary to the cam or elliptical or other non circular shaped such as a three node containing surfaces of the hub 472 and imparting forces 470 through the ball bearings 466 to the complementarily shaped outer race 462 that is also generally elliptical or other non circular shaped such as a three node containing shape and to the flex spline teeth 444, forcing them to mesh with the ring gear teeth 446 as the cam turns on shaft 12. A flex spline tooth 444a is shown as aligned with reference point P on the ring gear. FIG. 12B shows the shaft 12 rotating (R) 90 degrees C.W. FIG. 12C shows the shaft 12 rotated 180 degrees C.W. The alignment of tooth 444a has now shifted to be one tooth short of alignment with point P. FIG. 12D shows the shaft 12 rotated 360 degrees C.W. The alignment of tooth 444a has now shifted to be two teeth short of alignment with point P. This means that the flex spline has rotated (R) slightly less than the input shaft 12. This allows for high gear ratios such as up to 99/1.

The input shaft comprises the motor shaft 12 that rotates around the shaft axis 12a, the outer surface of which is compressibly mated with the inner circumferential surface 480 of the shaft receiving bore 474 of the hub of the gear. In the embodiment shown in FIGS. 10, 11, 12A, 12B, 12C, 12D the output shaft or disc being the inner race 414 of an output bearing 410, the interface surface 420 of the inner race 414 being attached to a complementary end surface 432 of the flexspline 430. The strain wave gear as shown is comprised of a housing 400 on which a slewing ring bearing is mounted at the front end. The outer race 412 of the bearing is bolted to the housing and the inner race 414 is part of an armature 418 which is supported by rollers 416. The slewing ring bearing provides superior stability against any forward to backward movement of the armature as it turns in the housing. The forward end or face 422 of the armature has a bolt pattern 424 on which the drive disc 500 is fastened by screws 428 which pass through bolt pattern 502. The cam member 600 is bolted to armature 418 through one of the holes in bolt pattern 502 of the drive disc 500 and is rotated eccentrically a distance ED around output rotation axis R3a. The shoulder bolt 602 clamps a boss 604 to the disc 500 that is drivably rotated around the gear reducer rotation axis R3a, FIGS. 10, 11. The boss forms an inner race for roller bearings 606. The outer race 608 has an outer surface 600cs that drives the sled 43 up and down. At the rearward end 420 of the armature there is a bolt pattern 426 to which the flex spline 430 is bolted. The flex spline is cup shaped. The forward end 432 is closed and has a bolt pattern 436 for securing the end of the flex spline to the armature by means of clamping plate 436 and bolts 438. The sidewall 440 of the flex spline is thin for flexibility but retains good torsional strength. The rearward end of the cup shape 442 is open to receive the wave generator 460. The exterior surface of the rim has gear teeth 444 which selectively engage teeth 446 on the ring gear 448 as the wave generator rotates. The wave generator is mounted on the motor drive shaft 12 by hub 472. Hub 472 has an aperture 474 lined with compressible wedge shaped sleeves 480. When screws 478 are tightened, they force the clamping ring 476 rearward compressing the sleeves and self-centering and clamping the hub to the shaft 12 without the use of Allen set screws or keyways for smoother operation. The wave generator 460 is composed of an oval shaped cam formed on hub 472 on which is mounted by force fit, a ball bearing assembly with a flexible inner race that is force fit on the cam portion of hub 472. Lobes 482 on the hub form the inner race 464 into a cam with two lobes 468 formed 180 degrees apart in an oval shape. The outer race 462 can be rigid in the form an ellipse or other non circular shaped such as a three node containing shape complementary to the elliptical shape or other non circular shaped such as a three node containing shape of the hub 472 and the inner race 464 or can be thin and flexible so it can conform to the shape of the cam such that it projects outward (arrows 470, FIGS. 12A & 12B) together with ball bearings 466 as the shaft 12 rotates, to force the gear teeth 444, 446 to mesh at locations 450. The teeth 444 at locations 452 flex inward after the lobes have passed to allow clearance for one or more of the teeth 444 to skip the ring gear teeth 446 and allow the flex spline 430 to rotate in relation to the ring gear 448 as dictated by the gear ratio and number of teeth.

The nature of the arrangement of the operative components (wave generator, flex spline, circular spline) of the strain wave gear 46, 400 in a nested fashion provide a physical device depth GD, diameter DIA or physical size that is adapted to be compact and space efficient enough or sufficient to enable the device to be mounted to the housing of the rotary to linear converter 40, and to be readily mountable to and dismountable from, alone or together with the rotary to linear converter, either one or the other of the top clamping plate and the heated manifold.

Figure 17A:
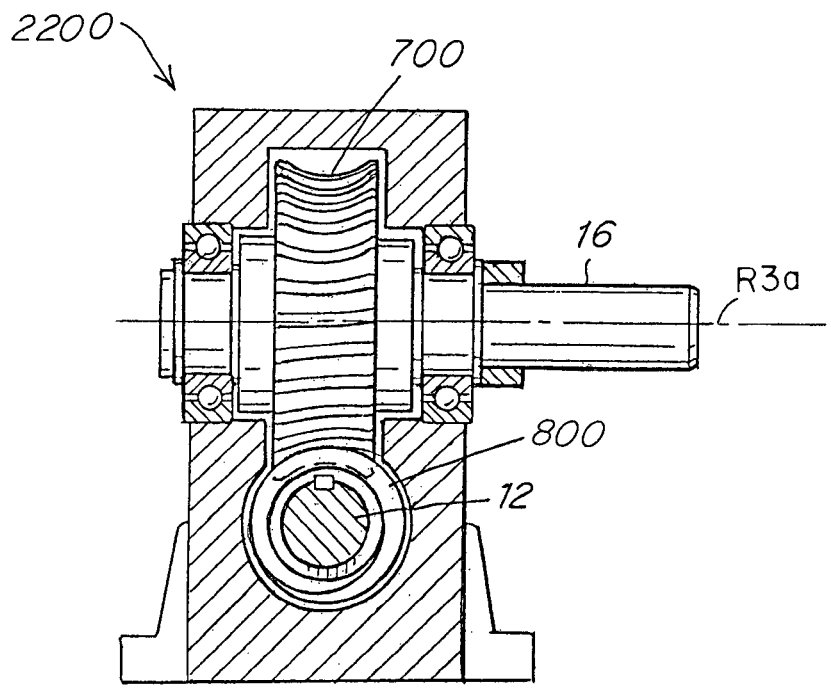
FIGS. 17A, 17B, 17C and 17D are examples of alternative gear assemblies for changing rotational speed or torque of a rotary actuator.
Figure 17B:
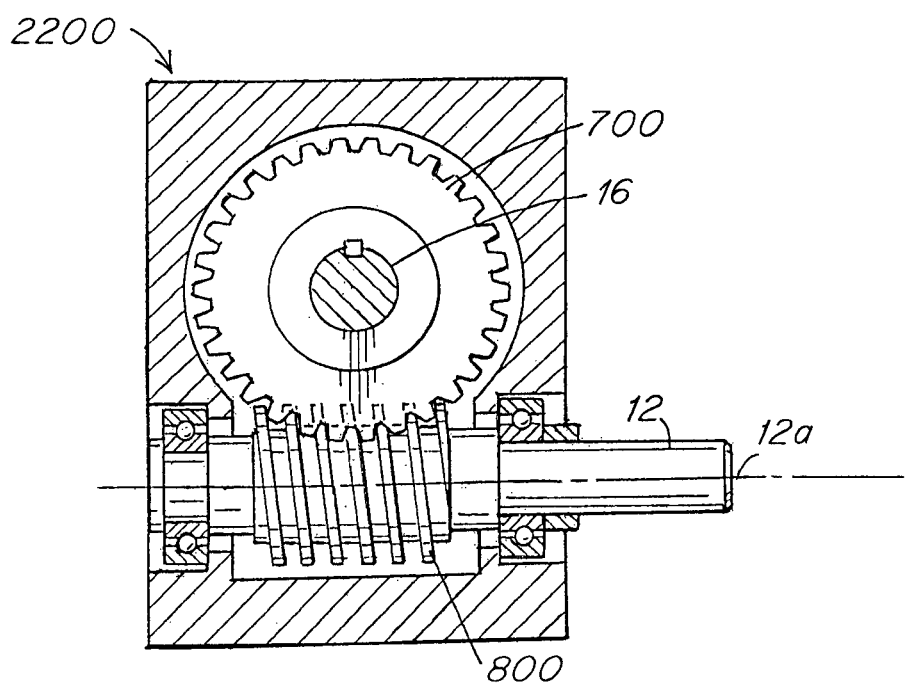
Figure 17C:
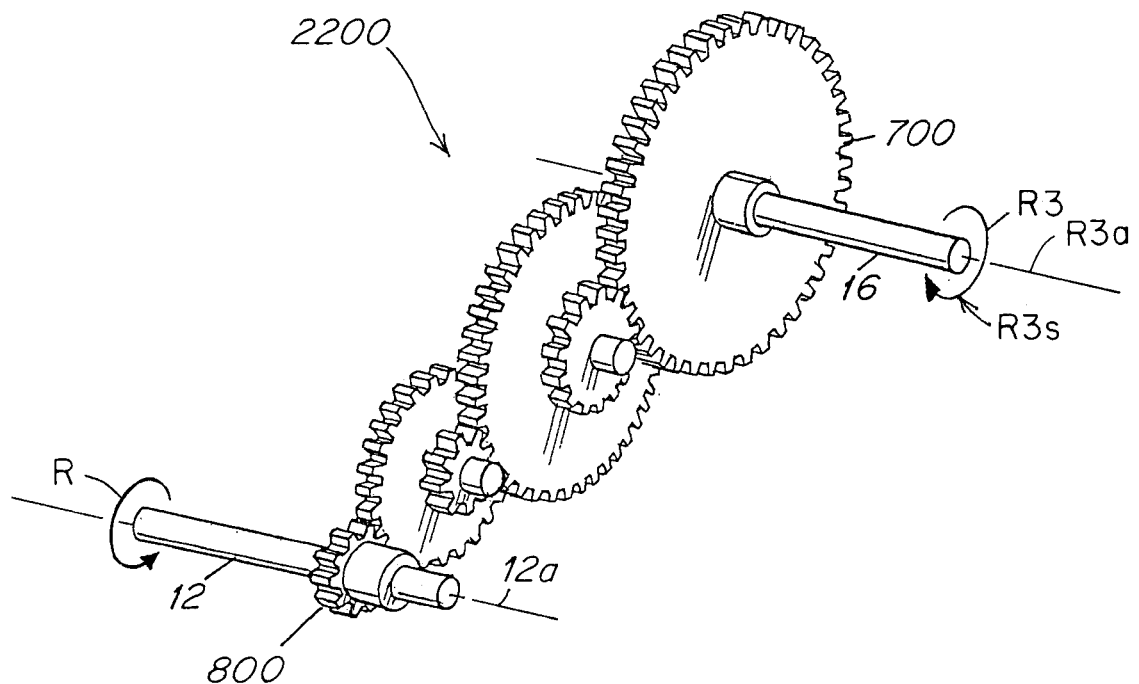
Figure 17D:
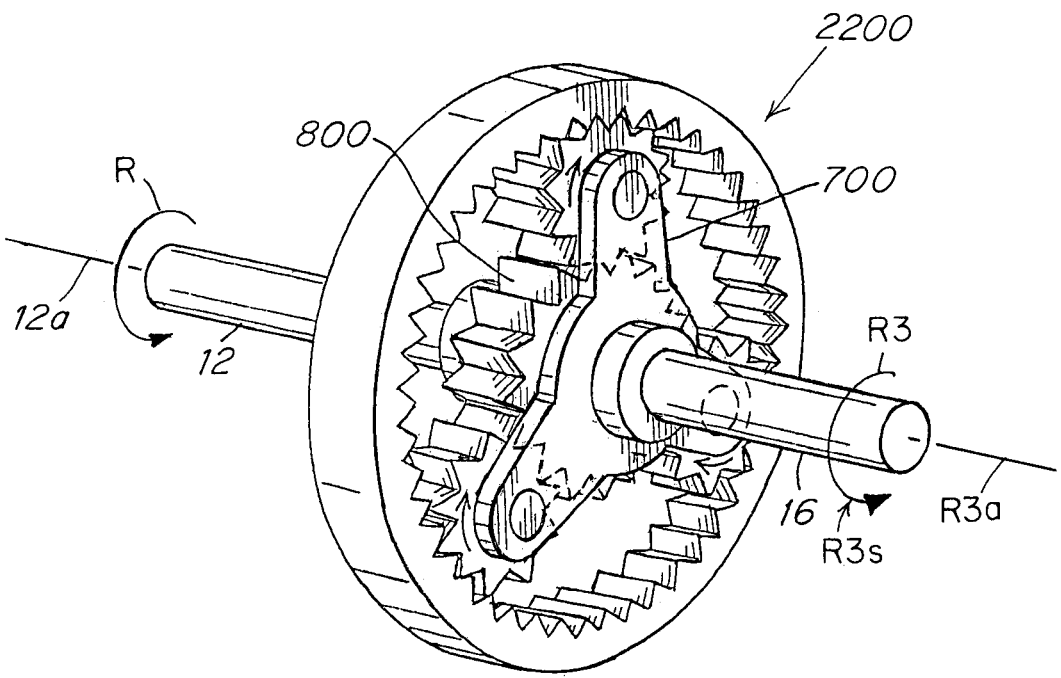

Alternatively the speed reducing, torque increasing device can comprise an assembly such as shown in FIGS. 17A (worm gear assembly), 17B (spur gear assembly), 17C (planetary gear assembly) where the rotor 12 of the motor 200 is connected to and rotates the highest speed rotating gear or gear tooth containing component 800 of the assembly 2200 and the intermediate shaft is connected to and rotated by the highest rotating gear or gear tooth containing component 700 of the assembly 2200 to effectively reduce the rotational speed and increase the torque output of the rotor 12 that is transmitted to the output shaft 16*o* that is driven at a reduced speed R3 and higher torque R3*s*. Other assemblies such as helical gear assemblies, FIG. 17D, or belts and pulley arrangements and assemblies can be used to affect such speed changing and torque changing.

An injection molding apparatus (5) comprising an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that control injection of the injection fluid (9) into the mold cavity, the one or more valves (50) being comprised of:

an electrically driven actuator (200) having a rotatable rotor or motor shaft (12) and a strain wave gear (46) that includes a generally elliptical or other non circular shaped member interconnected to the drive shaft or rotor (12) and adapted to be rotatably driven at a selected lower rotational speed relative to a rotational speed of the drive shaft or rotor (12) and drivably interconnected to the valve pin (100) such that the valve pin (100) is driven along a linear path of travel, a position sensor adapted to sense rotational positon of the rotatable rotor or motor shaft or the generally elliptical or other non circular shaped member or adapted to sense linear position of the valve pin (100).

The position sensor can comprise an encoder (EN) that is mounted and adapted to sense rotational position of the valve pin 100

The position sensor can alternatively comprises a hall effect sensor (PS) that detects a magnetic field generated by a magnet (M) associated with linear motion of the valve pin (100).

What is claimed is:

1. An injection molding apparatus (5) comprising an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that controls injection of the injection fluid (9) into the mold cavity, the one or more valves (50) being comprised of:

an electrically driven actuator (200) having a driven rotatable rotor drivably rotatably interconnected to a shaft (12) or to an output rotation device (16, 430, 500) that is rotatably drivable 360 degrees around an output rotation axis (12*a*, R3*a*), a rotary to linear converter device that includes an eccentric (600) that is eccentrically disposed or mounted off center a selected distance (ED, R) from the output rotation axis (12*a*, R3*a*) in an arrangement such that when the shaft (12) or rotation device (16, 430, 500) is rotatably driven, the eccentric (600) is eccentrically rotatably drivable around the output rotation axis (12*a*, R3*a*) to selectable angular positions above and below either a 270 degree position or a 90 degree position, a controller interconnected to the shaft (12) or output rotation device (16, 430, 500), the controller including an algorithm that controllably limits rotation of the shaft (12) or output rotation device (16, 430, 500) during the course of an entire injection cycle to angular positions between about 70 degrees above and 70 degrees below the 270 degree position or between about 70 degrees above and 70 degrees below the 90 degree position, the pin or shaft (100) being interconnected to or interengaged with the driven eccentric (600) in an arrangement such that the pin or shaft (100) is driven reciprocally along a linear path of travel (A) as the eccentric (600) is eccentrically rotatably driven.

2. The apparatus of claim 1 wherein a preselected angular position between the 270 or 90 degree position and 70 degrees above defines a fully open valve pin position (PFO) and a preselected angular position between the 270 or 90 degree position and 70 degrees below defines a valve pin position where the gate is closed (PFC).

3. The apparatus of claim 1 wherein the eccentric comprises a cam member (600), the rotary to linear converter device including a slide or sled (43) interconnected to the drive shaft or rotor (12), the slide or sled (43) having a cammed slot (43*sl*) having a slot surface (43*ss*) adapted to engage an exterior surface (600*cs*) of the eccentric (600) to cause the sled or slide (43) to move along the linear path of travel (A) as the eccentric (600) is eccentrically rotatably driven around the output rotation axis (12*a*, R3*a*).

4. An apparatus according to claim 1 wherein the rotary to linear converter device is adapted to mechanically or frictionally stop or limit linear travel of the valve pin (100) at or to selectable linear positions.

5. An apparatus according to claim 1 wherein the cam member (600), slide or sled (43) or associated mounts (40) are adapted to exert a radial force (RF) between the slide or sled (43) and a complementary fixed surface (40*as*) at selectable rotational or angular positions of the cam member (600), the radial force (RF) being sufficient to stop rotational movement of the cam member (600) or to stop linear movement of the slide or sled (43).

6. An apparatus according to claim 1 further including a rotational speed reducing mechanism (46) interconnected to the drive shaft or rotor (12) of the actuator (200), the rotational speed reducing mechanism (46) being comprised of a rotatably driven generally elliptical or other non-circular shaped device (430, 472) or one or more rotatably driven gears (430, 700) interconnected to the drive shaft or rotor (12) in an arrangement such that rotation of the drive shaft or rotor (12) is transmitted to an output rotation device (16, 430, 500) to cause the output rotation device (16, 430, 500)

to be rotatably driven at a selected lower rotational speed relative to a rotational speed of the drive shaft or rotor (12).

7. An apparatus according to claim 6 wherein the rotational speed reducing mechanism comprises a strain wave gear.

8. An apparatus according to claim 1 wherein the electrically driven actuator (200) is mounted in a remote location or position relative to the heated manifold (60) such that the electrically driven actuator (200) is insulated or isolated from thermal communication with the heated manifold (60).

9. An apparatus according to claim 1 wherein an elongated shaft (20, 20*f*) drivably interconnects the rotatable output shaft (12) or the output rotation device (16, 430, 500) to a linear converter (40) that is interconnected to the pin or shaft (100) to convert rotation of the shaft (12) or the output rotation device (16, 430, 500) to linear motion and drive the pin or shaft (100) linearly.

10. An apparatus according to claim 9 wherein the elongated shaft has a length (CL) sufficient to mount the actuator (200) in a position or location remote from the heated manifold (60) such that the actuator (200) is isolated from substantial heat communication with the heated manifold (60) wherein the actuator remains interconnected to the valve pin (100) via the elongated shaft (20, 20*f*).

11. An apparatus according to claim 1 wherein an elongated cable or shaft (20*f*) having a length (CL) and a cable axis (CA) that is flexibly bendable along at least a portion of the cable axis (CA) into a curved or curvilinear configuration (CF) interconnects the shaft (12) or the output rotation device (16, 430, 500) to a rotary to linear converter (40) that is interconnected to the pin or shaft (100) to convert rotation of the output shaft (12) or the output rotation device (16, 430, 500) to linear motion and drives the pin or shaft (100) linearly.

12. An apparatus according to claim 1 wherein the algorithm controllably limits rotation of the shaft (12) or output rotation device (16, 430, 500) during the course of an entire injection cycle to angular positions between about 40 degrees above and 40 degrees below the 270 degree position or between about 40 degrees above and 40 degrees below the 90 degree position wherein a preselected angular position between 40 degrees above the 270 or 90 degree position defines the fully open valve pin position (PFO) and a preselected angular position 40 below the 270 or 90 degree position defines the valve pin position where the gate is closed (PFC).

13. An apparatus according to claim 1 wherein the valve pin (100) is maintained in engagement with a radial surface (600*cs*) under a spring force (SF).

14. A method of injecting a selected injection fluid (9) into a cavity (80) of a mold (70) in an injection molding apparatus (5) comprised of an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that controls injection of the injection fluid (9) into the mold cavity, the method comprising:
 selecting an electrically driven actuator (200) having a driven rotatable rotor drivably rotatably interconnected to an output shaft (12) or to an output rotation device (16, 430, 500) that is rotatably driven around an output rotation axis (12*a*, R3*a*),
 disposing or mounting an eccentric (600) eccentrically off center a selected distance (ED, R) from the output rotation axis (12*a*, R3*a*) in an arrangement such that when the shaft (12) or rotation device (16, 430, 500) is rotatably driven, the eccentric (600) is eccentrically rotatably driven around the output rotation axis (12*a*, R3*a*),
 controllably rotating the shaft (12) or output rotation device (16, 430, 500) during the course of an entire injection cycle to angular positions between about 70 degrees above and 70 degrees below the 270 degree position or between about 70 degrees above and 70 degrees below the 90 degree position,
 wherein a preselected angular position between the 270 or 90 degree position and 70 degrees above defines a fully open valve pin position (PFO) and a preselected angular position between the 270 or 90 degree position and 70 degrees below defines a valve pin position where the gate is closed (PFC),
 interconnecting to or interengaging with the pin or shaft (100) the driven cam member (600) in an arrangement such that the pin or shaft (100) is drivable reciprocally along a linear path of travel (A) as the eccentric (600) is eccentrically rotatably driven,
 controllably operating the electrically driven actuator to drive the pin or shaft (100).

15. A method according to claim 14 wherein a preselected angular position between the angular position that corresponds to the selected maximum moment arm and 70 degrees above defines a fully open valve pin position (PFO) and a preselected angular position between the angular position that corresponds to the selected maximum moment arm and 70 degrees below defines a valve pin position where the gate is closed (PFC).

16. An injection molding apparatus (5) comprising an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that controls injection of the injection fluid (9) into the mold cavity, the one or more valves (50) being comprised of:
 an electrically driven actuator (200) having a driven rotatable rotor drivably rotatably interconnected to a shaft (12) or to an output rotation device (16, 430, 500) that is rotatably drivable 360 degrees around an output rotation axis (12*a*, R3*a*),
 a rotary to linear converter device that includes an eccentric (600) that is eccentrically disposed or mounted off center a selected distance (ED, R) from the output rotation axis (12*a*, R3*a*) in an arrangement such that when the shaft (12) or rotation device (16, 430, 500) is rotatably driven, the eccentric (600) is eccentrically rotatably drivable around the output rotation axis (12*a*, R3*a*) to selectable angular positions above and below either a 270 degree position or a 90 degree position,
 a controller interconnected to the shaft (12) or output rotation device (16, 430, 500), the controller including an algorithm that controllably limits rotation of the shaft (12) or output rotation device (16, 430, 500) during the course of an entire injection cycle to selectable angular positions that create a moment arm that extends between a selected minimum moment arm and a selected maximum moment arm, the selectable angular positions being between 70 degrees above and 70 degrees below an angular position that corresponds to the selected maximum moment arm,
 the pin or shaft (100) being interconnected to or interengaged with the driven eccentric (600) in an arrangement such that the pin or shaft (100) is driven reciprocally along a linear path of travel (A) as the eccentric (600) is eccentrically rotatably driven.

17. The apparatus of claim 16 wherein a preselected angular position between the angular position that corresponds to the selected maximum moment arm and 70 degrees above defines a fully open valve pin position (PFO) and a preselected angular position between the angular position that corresponds to the selected maximum moment arm and 70 degrees below defines a valve pin position where the gate is closed (PFC).

18. An apparatus according to claim 16 wherein the selectable angular positions are between 40 degrees above and 40 degrees below the angular position that corresponds to the selected maximum moment arm.

19. An apparatus according to claim 16 wherein a first selected angular position disposed between the angular position that corresponds to the maximum moment arm and 70 degrees above the angular position that corresponds to the maximum moment arm defines a valve pin fully open position and wherein a second selected angular position disposed between the angular position that corresponds to the maximum moment arm and 70 degrees below the angular position that corresponds to the maximum moment arm defines an end of stroke, valve pin closed or gate closed position.

20. An apparatus according to claim 16 wherein a first selected angular position disposed between the angular position that corresponds to the maximum moment arm and 40 degrees above the angular position that corresponds to the maximum moment arm defines a valve pin fully open position and wherein a second selected angular position disposed between the angular position that corresponds to the maximum moment arm and 40 degrees below the angular position that corresponds to the maximum moment arm defines an end of stroke, valve pin closed or gate closed position.

21. An apparatus according to claim 16 wherein the eccentric comprises a cam member (600), the rotary to linear converter device including a slide or sled (43) interconnected to the drive shaft or rotor (12), the slide or sled (43) having a cammed slot (43*sl*) having a slot surface (43*ss*) adapted to engage an exterior surface (600*cs*) of the eccentric (600) to cause the sled or slide (43) to move along the linear path of travel (A) as the eccentric (600) is eccentrically rotatably driven around the output rotation axis (12*a*, R3*a*).

22. An apparatus according to claim 16 wherein the rotary to linear converter device is adapted to mechanically or frictionally stop or limit linear travel of the valve pin (100) at or to selectable linear positions.

23. An apparatus according to claim 16 wherein the cam member (600), slide or sled 43 or associated mounts 40 can be adapted to exert a radial force (RF) between the slide or sled (43) and a complementary fixed surface (40*as*) at selectable rotational or angular positions of the cam member (600), the radial force (RF) being sufficient to stop rotational movement of the cam member (600) or to stop linear movement of the slide or sled (43).

24. An apparatus according to claim 16 further including a rotational speed reducing mechanism (46) interconnected to the drive shaft or rotor (12) of the actuator (200), the rotational speed reducing mechanism (46) being comprised of a rotatably driven generally elliptical or other non-circular shaped device (430, 472) or one or more rotatably driven gears (430, 700) interconnected to the drive shaft or rotor (12) in an arrangement such that rotation of the drive shaft or rotor (12) is transmitted to an output rotation device (16, 430, 500) to cause the output rotation device (16, 430, 500) to be rotatably driven at a selected lower rotational speed relative to a rotational speed of the drive shaft or rotor (12).

25. An apparatus according to claim 16 wherein the rotational speed reducing mechanism comprises a strain wave gear.

26. An apparatus according to claim 16 wherein the electrically driven actuator (200) is mounted in a remote location or position relative to the heated manifold (60) such that the electrically driven actuator (200) is insulated or isolated from thermal communication with the heated manifold (60).

27. An apparatus according to claim 16 wherein an elongated shaft (20, 20*f*) drivably interconnects the rotatable output shaft (12) or the output rotation device (16, 430, 500) to a linear converter (40) that is interconnected to the pin or shaft (100) to convert rotation of the output shaft (12) or the output rotation device (16, 430, 500) to linear motion and drive the pin or shaft (100) linearly.

28. An apparatus according to claim 16 wherein the elongated shaft has a length (CL) sufficient to mount the actuator (200) in a position or location remote from the heated manifold (60) such that the actuator (200) is isolated from substantial heat communication with the heated manifold (60) wherein the actuator remains interconnected to the valve pin (100) via the elongated shaft (20, 20*f*).

29. An apparatus according to claim 16 wherein an elongated cable or shaft (20*f*) having a length (CL) and a cable axis (CA) that is flexibly bendable along at least a portion of the cable axis (CA) into a curved or curvilinear configuration (CF) interconnects the rotatable output shaft (12) or the output rotation device (16, 430, 500) to a rotary to linear converter (40) that is interconnected to the pin or shaft (100) to convert rotation of the output shaft (12) or the output rotation device (16, 430, 500) to linear motion and drives the pin or shaft (100) linearly.

30. An apparatus according to claim 16 wherein the cam member (600) comprises a disk, wheel, pin or projection (600*p*) projecting axially from a rotatable member (500) that is controllably rotatable around a rotation axis (R3*a*) or comprises a radial surface (600*cs*) of a rotatable member (500) controllably rotatable around a rotation axis (R3*a*).

31. An apparatus according to claim 16 wherein the valve pin (100) is maintained in engagement with a radial surface (600*cs*) under a spring force (SF).

32. A method of injecting a selected injection fluid (9) into a cavity (80) of a mold (70) in an injection molding apparatus (5) comprised of an injection molding machine (IMM), a heated manifold (60) that receives injection fluid (9) from the injection molding machine and distributes the injection fluid through a fluid distribution channel (120), a mold (70) having a cavity (80) and one or more valves (50) having a valve pin (100) that controls injection of the injection fluid (9) into the mold cavity, the method comprising:

selecting an electrically driven actuator (200) having a driven rotatable rotor drivably rotatably interconnected to an output shaft (12) or to an output rotation device (16, 430, 500) that is rotatably driven around an output rotation axis (12*a*, R3*a*), disposing or mounting an eccentric (600) eccentrically off center a selected distance (ED, R) from the output rotation axis (12*a*, R3*a*) in an arrangement such that when the shaft (12) or rotation device (16, 430, 500) is rotatably driven, the eccentric (600) is eccentrically rotatably driven around the output rotation axis (12*a*, R3*a*), controllably rotating the shaft (12) or output rotation device (16, 430, 500) during the course of an entire injection cycle to selectable angular positions that create a moment arm that extends between a selected minimum moment arm and a selected maximum moment arm, the selectable angular positions being between 70 degrees above and 70 degrees below an angular position that corresponds to the selected maximum moment arm, interconnecting to or interengaging with the pin or shaft (100) the driven cam member (600) in an arrangement such that the pin or shaft (100) is drivable reciprocally along a linear path of travel (A) as the eccentric (600) is eccentrically rotatably driven, controllably operating the electrically driven actuator to drive the pin or shaft (100).

33. A method according to claim 32 wherein a preselected angular position between the angular position that corresponds to the selected maximum moment arm and 70 degrees above defines a fully open valve pin position (PFO) and a preselected angular position between the angular position that corresponds to the selected maximum moment arm and 70 degrees below defines a valve pin position where the gate is closed (PFC).

\* \* \* \* \*